United States Patent
Matsushita et al.

(10) Patent No.: US 7,746,507 B2
(45) Date of Patent: Jun. 29, 2010

(54) IMAGE PROCESSING APPARATUS FOR IMAGE RETRIEVAL AND CONTROL METHOD THEREFOR

(75) Inventors: Masahiro Matsushita, Yokohama (JP); Hiroshi Tojo, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 1006 days.

(21) Appl. No.: 11/460,548

(22) Filed: Jul. 27, 2006

(65) Prior Publication Data

US 2007/0036468 A1    Feb. 15, 2007

(30) Foreign Application Priority Data

Aug. 9, 2005    (JP) ............................. 2005-231171

(51) Int. Cl.
*H04N 1/40* (2006.01)
(52) U.S. Cl. .................. 358/448; 358/403; 358/451; 358/452; 358/462; 382/190; 382/192; 382/209; 382/219; 382/220
(58) Field of Classification Search ................ 358/448, 358/403, 451, 452, 462; 382/190, 192, 209, 382/219, 220
See application file for complete search history.

(56) References Cited

U.S. PATENT DOCUMENTS

| 4,254,400 | A | * | 3/1981 | Yoda et al. ............... | 382/194 |
| 4,734,782 | A | * | 3/1988 | Maeshima ................ | 358/466 |
| 4,860,371 | A | * | 8/1989 | Matsuyama et al. ........ | 382/149 |

(Continued)

FOREIGN PATENT DOCUMENTS

DE    19708265 A1    9/1997

(Continued)

OTHER PUBLICATIONS

Doermann D et al: "The development of a general framework for intelligent document image retrieval," Internet Citation, [Online] Aug. 1996 (Aug. 1998), XP002342750, retrieved from the Internet: URL: http://citeseer.ist.psu.edu/doermann96development.html> [retrived on Aug. 30, 2005] p. 8, paragraph 2-p. 21, last paragraph.

(Continued)

*Primary Examiner*—King Y Poon
*Assistant Examiner*—Kenneth Kwan
(74) *Attorney, Agent, or Firm*—Canon U.S.A., Inc. I.P. Division

(57) ABSTRACT

Even if a margin area, which did not exist in an original image, is present around a document area in a document acquired by printing the original image, an accurate layout comparison between the scanned image of the printed document and the original image can be performed as follows. An original image serving as a comparison target image is input, and block information about a block included in the original image is extracted. It is determined whether the size of the original image is a predetermined size. When the size is not a predetermined size, block information about the block included in the original image mapped to a predetermined size is created and registered. When a comparison source image is input, block information about a block included in the comparison source image is extracted. Subsequently, two pieces of the block information of the comparison source and target images are compared.

7 Claims, 18 Drawing Sheets

U.S. PATENT DOCUMENTS

| | | | | |
|---|---|---|---|---|
| 4,926,213 | A * | 5/1990 | Komatsubara et al. | 355/49 |
| 4,933,771 | A * | 6/1990 | Matsuura et al. | 358/296 |
| 5,265,171 | A * | 11/1993 | Sangu | 382/177 |
| 5,611,024 | A * | 3/1997 | Campbell et al. | 358/1.15 |
| 5,751,854 | A * | 5/1998 | Saitoh et al. | 382/218 |
| 5,760,912 | A * | 6/1998 | Itoh | 358/296 |
| 5,761,338 | A * | 6/1998 | Kasamatsu | 382/176 |
| 5,768,481 | A * | 6/1998 | Chan et al. | 358/1.2 |
| 5,778,092 | A * | 7/1998 | MacLeod et al. | 382/176 |
| 5,800,355 | A * | 9/1998 | Hasegawa | 600/436 |
| 5,848,185 | A * | 12/1998 | Koga et al. | 382/173 |
| 5,933,823 | A * | 8/1999 | Cullen et al. | 1/1 |
| 6,061,474 | A * | 5/2000 | Kajiwara et al. | 382/238 |
| 6,154,286 | A * | 11/2000 | Konno et al. | 358/1.13 |
| 6,178,417 | B1 * | 1/2001 | Syeda-Mahmood | 1/1 |
| 6,272,247 | B1 * | 8/2001 | Manickam et al. | 382/217 |
| 6,298,172 | B1 * | 10/2001 | Arney et al. | 382/293 |
| 6,314,213 | B1 * | 11/2001 | Miyahara et al. | 382/312 |
| 6,345,275 | B2 * | 2/2002 | Lee | 1/1 |
| 6,351,556 | B1 * | 2/2002 | Loui et al. | 382/164 |
| 6,397,213 | B1 * | 5/2002 | Cullen et al. | 1/1 |
| 6,731,800 | B1 * | 5/2004 | Barthel et al. | 382/176 |
| 7,272,269 | B2 * | 9/2007 | Tojo et al. | 382/305 |
| 7,333,234 | B2 * | 2/2008 | Nihei | 358/1.2 |
| 7,593,961 | B2 * | 9/2009 | Eguchi et al. | 1/1 |
| 2001/0033685 | A1 * | 10/2001 | Ishiyama | 382/154 |
| 2001/0035865 | A1 * | 11/2001 | Utterback et al. | 345/474 |
| 2001/0043756 | A1 * | 11/2001 | Morita | 382/284 |
| 2001/0055414 | A1 * | 12/2001 | Thieme | 382/135 |
| 2002/0003896 | A1 * | 1/2002 | Yamazaki | 382/135 |
| 2002/0006233 | A1 * | 1/2002 | Adachi et al. | 382/289 |
| 2002/0044298 | A1 * | 4/2002 | Kaneko et al. | 358/1.15 |
| 2002/0078098 | A1 * | 6/2002 | Shirai | 707/517 |
| 2002/0140951 | A1 * | 10/2002 | Nihei | 358/1.2 |
| 2003/0095723 | A1 * | 5/2003 | Ishizaka et al. | 382/298 |
| 2003/0103683 | A1 * | 6/2003 | Horie | 382/284 |
| 2004/0012814 | A1 * | 1/2004 | Tanaka et al. | 358/1.18 |
| 2004/0057634 | A1 * | 3/2004 | Mutoh | 382/298 |
| 2004/0131262 | A1 * | 7/2004 | Hara et al. | 382/232 |
| 2004/0146202 | A1 * | 7/2004 | Hyoki | 382/209 |
| 2005/0165747 | A1 * | 7/2005 | Bargeron et al. | 707/3 |
| 2007/0036468 | A1 * | 2/2007 | Matsushita et al. | 382/305 |
| 2008/0319989 | A1 * | 12/2008 | Ikeda et al. | 707/5 |

FOREIGN PATENT DOCUMENTS

| | | |
|---|---|---|
| EP | 1473642 A2 | 11/2004 |
| JP | 07-028977 A | 1/1995 |
| JP | 07074918 A * | 3/1995 |
| JP | 11-328417 A | 11/1999 |
| JP | 2002-354220 A | 12/2002 |
| JP | 2004-348706 A | 12/2004 |
| WO | 00/49526 A | 8/2000 |

OTHER PUBLICATIONS

Herrmann P et al: "Retrieval of document images using layout knowledge," Document Analysis and Recognition, 1993., Proceedings of the Second International Conference on Tsukuba Science City, Japan Oct. 20-22, 1993, Los Alamitos, CA, USA, IEEE COMPUT. SOC, Oct. 20, 1993, pp. 537-540, XP010135722, ISBN: 0-8186-4960-7.

Hamano T Ed—Institute of Electrical and Electronics Engineers: "A similarity retrieval method for image databases using simple graphics," Workshop on Languages for Automation. Symbiotic and Intelligent Robotics. College Park, MD., Aug. 29-31, 1998, Proceedings of Workshop on Languages for Automation, Washington, IEEE COMP. SOC. Press, US, Aug. 29, 1988, pp. 149-154, XP000118740, ISBN: 0-8186-0890-0.

* cited by examiner

FIG. 4

| DOCUMENT ID | ADDRESS | PAGE SIZE (w, h) |
|---|---|---|
| 00000001 | http://abc/doc/ship.doc | 2480, 3508 |
| 00000002 | \\host\img\car.bmp | 1240, 2480 |
| 00000003 | \\host\img\car.bmp | 2480, 3508 |
| 00000004 | \\host\img\car.bmp | 2480, 3508 |

FIG. 5

| DOCUMENT ID | BLOCK ID | ATTRIBUTE | POSITION (x, y) | SIZE (w, h) |
|---|---|---|---|---|
| 00000001 | 0001 | IMAGE | 100, 200 | 1000, 800 |
| 00000001 | 0002 | IMAGE | 1200, 200 | 1180, 800 |
| 00000001 | 0003 | TEXT | 100, 1200 | 2280, 1300 |
| 00000002 | 0001 | IMAGE | 360, 100 | 500, 800 |
| 00000002 | 0002 | TEXT | 100, 1100 | 1240, 1180 |
| 00000003 | 0001 | IMAGE | 980, 614 | 500, 800 |
| 00000003 | 0002 | TEXT | 720, 1614 | 1240, 1180 |
| 00000004 | 0001 | IMAGE | 872, 141 | 707, 1132 |
| 00000004 | 0002 | TEXT | 504, 1556 | 1754, 1669 |

STANDARD PAPER SIZE
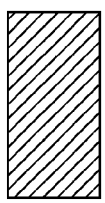 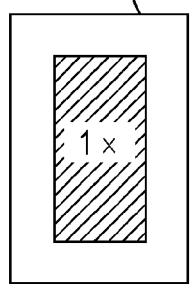 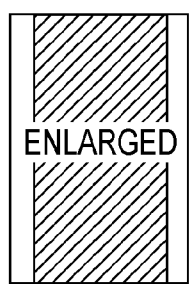 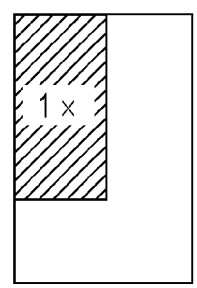 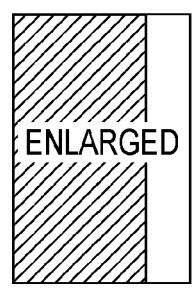
FIG. 6A   FIG. 6B   FIG. 6C   FIG. 6D   FIG. 6E
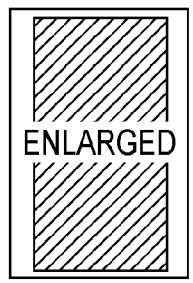 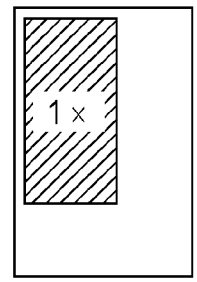 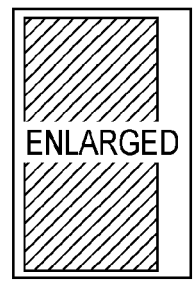
FIG. 6F   FIG. 6G   FIG. 6H
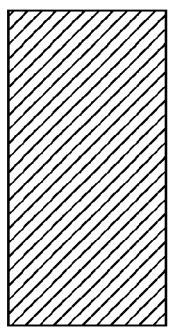 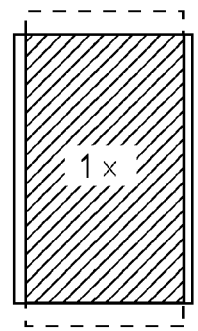 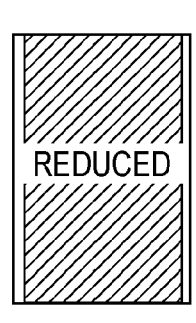
FIG. 6I   FIG. 6J   FIG. 6K

FIG. 7

| DOCUMENT ID | BLOCK ID | TEXT FEATURE QUANTITY |
|---|---|---|
| 00000001 | 0003 | ･･････ |
| 00000002 | 0002 | ･･････ |
| 00000003 | 0002 | ･･････ |
| 00000004 | 0002 | ･･････ |

FIG. 8

| DOCUMENT ID | BLOCK ID | COLOR FEATURE QUANTITY |
|---|---|---|
| 00000001 | 0001 | ･･････ |
| 00000001 | 0002 | ･･････ |
| 00000002 | 0001 | ･･････ |
| 00000003 | 0001 | ･･････ |
| 00000004 | 0001 | ･･････ |

FIG. 10

| DOCUMENT ID | SIMILARITY LEVEL |
|---|---|
| 0003 | 95 |
| 0005 | 78 |

 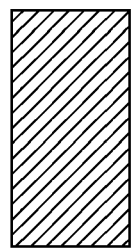 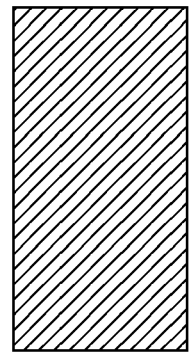 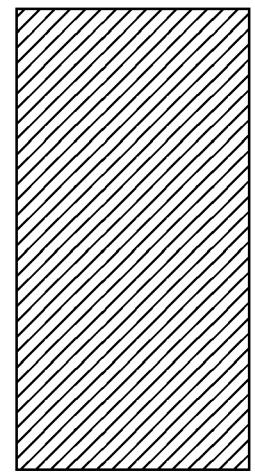
FIG. 17A          FIG. 17B          FIG. 17C          FIG. 17D
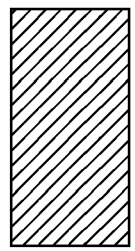 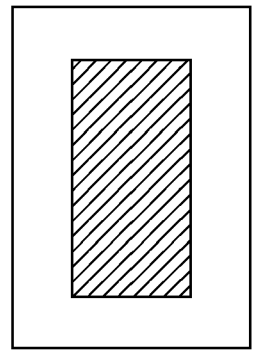 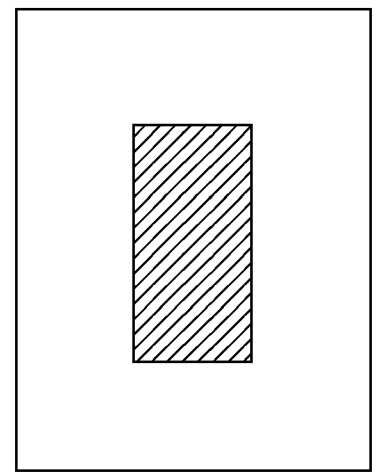
FIG. 18A          FIG. 18B          FIG. 18C

|   | 1 | 2 | 3 | 4 | 5 | 6 | 7 | 8 | . . . . |
|---|---|---|---|---|---|---|---|---|---------|
| 1 | 0 | 1 | 1 | 5 | 1 | 5 | 7 | 7 | . . . . |
| 2 |   | 0 | 2 | 1 | 1 | 7 | 2 | 5 | . . . . |
| 3 |   |   | 0 | 7 | 1 | 1 | 5 | 2 | . . . . |
| 4 |   |   |   | 0 | 1 | 9 | 1 | 7 | . . . . |
| : |   |   |   |   |   |   |   |   |         |

FIG. 23
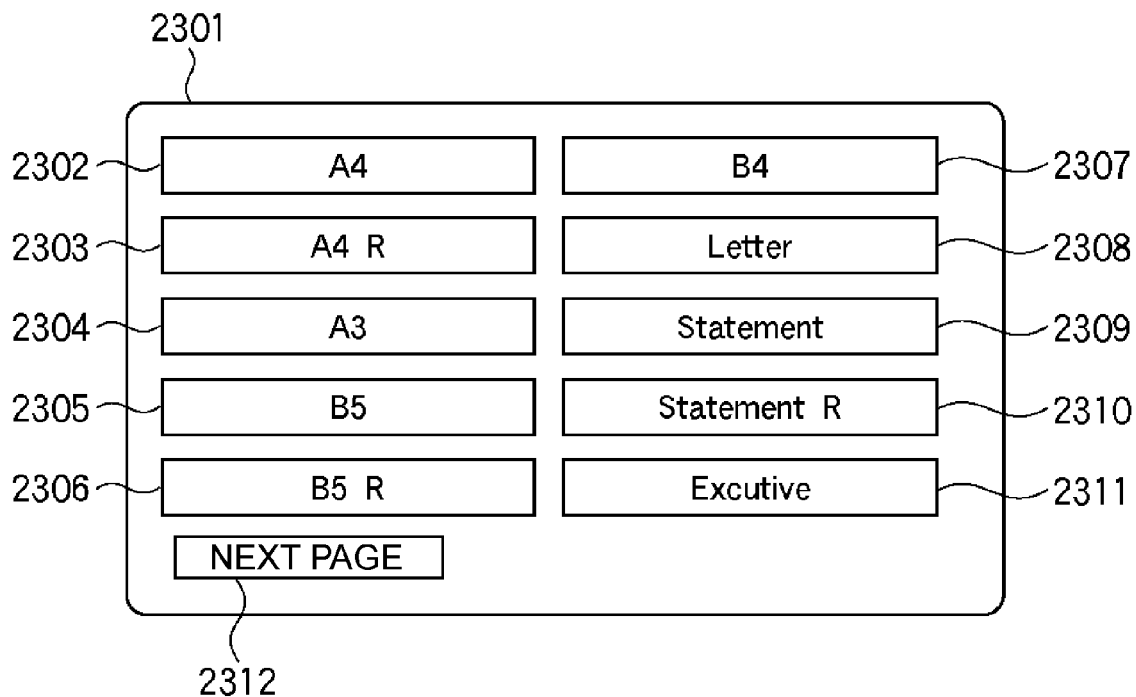
FIG. 24A
FIG. 24B
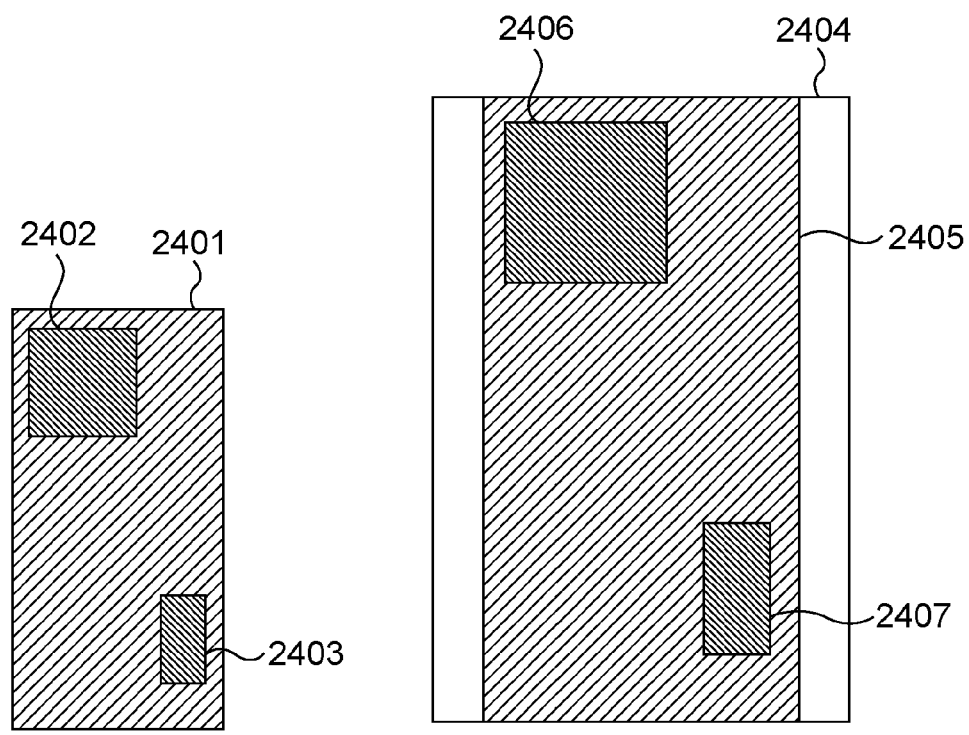

IMAGE PROCESSING APPARATUS FOR IMAGE RETRIEVAL AND CONTROL METHOD THEREFOR

BACKGROUND OF THE INVENTION

1. Field of the Invention

The present invention relates to an image processing apparatus and a control method therefore, and a program capable of retrieving original electronic data corresponding to a paper document having been read by an image input apparatus such as a copier, and using the retrieved original electronic data for the purpose of printing, distribution, storage, editing, or the like.

2. Description of the Related Art

Recently, with the increase in digitization, documents have been stored in databases as electronic files. There is an increasing demand for the easy retrieval of electronic files in databases using scanned images of printed documents. To this end, a method of analyzing a layout indicating the relationship between text or image areas included in a scanned document image and then comparing the analyzed layout with the layouts of electronic files in a database has been proposed. For example, Japanese Patent Laid-Open No. 11-328417 discloses a method of dividing an area of a document image into a plurality of sub-areas, and using the number of sub-areas as a criterion for restricting retrieval, and then comparing the features of the document image with the features of a document whose number of sub-areas matches that of the document image.

Here, for example, in the case of a document image of a catalog or the like, the catalog or the like is often printed on nonstandard-size paper other than standard-size paper such as A4- or letter-size paper. In this case, a printing paper size is set to a nonstandard size in the electronic file of the document image. However, when the electronic file of the document image is printed in an office or the like, it is often printed on standard-size paper. Strictly speaking, the most commonly used paper size is one of the A4 and letter sizes, and differs from country to country.

In a case where a nonstandard-size document image is printed on standard-size paper, when the nonstandard-size is smaller than the standard size, a large margin is generated due to the difference between aspect ratios. On the other hand, when the nonstandard-size is larger than the standard size, the document image to be printed is required to be reduced so that the entire document area thereof can fit into the standard size without being deformed. Consequently, a large margin is also generated in this case.

An example will be described with reference to FIGS. 24A and 24B. An original image 2401 is an image acquired by rasterizing one page included in an electronic file in which a paper size has been set to a nonstandard size. The original image 2401 includes text or image areas 2402 and 2403.

A scanned image 2404 is an image acquired by scanning the original image having been printed on standard-size paper. Here, since the paper size was set to a nonstandard size, the original image has been reduced so that the document area thereof can be printed without being deformed. Therefore, the document area in the scanned image 2404 corresponds to a rectangular area 2405.

The text or image areas 2402 and 2403 in the original image 2401 correspond to areas 2406 and 2407 in the scanned image 2404, respectively. It can be shown that the positions of the text or image areas 2402 and 2403 in the original image 2401 are very different from those of the areas 2406 and 2407 in the scanned image 2404.

In Japanese Patent Laid-Open No. 11-328417, the size of each sub-area is normalized by normalizing the size of an entire image so as to avoid the effect of scaling of an image. However, as described previously, a margin area, which did not exist in the original image, is present around the document areas in the scanned image. Accordingly, even if the normalization of an entire image is performed, the positions of sub-areas in the scanned image are still different from those of sub-areas in the original image. Consequently, in such a case, even if a layout comparison between the original image and the scanned image is performed, it cannot be determined whether they have the same layout.

SUMMARY OF THE INVENTION

The present invention provides an image processing apparatus and a control method therefor, and a program capable of performing an accurate layout comparison between an original image and the scanned image of a document acquired by printing the original image, even if in a case where a margin area, which did not exist in the original image, is present around a document area in the scanned image.

According to an aspect of the present invention, an image processing apparatus is provided for performing image similarity comparison processing. The apparatus includes a first input unit configured to input an original image that serves as a comparison target image; a first extracting unit configured to extract block information about a block included in the original image; a first determining unit configured to determine whether the size of the original image is a predetermined size; a creating unit configured to create, when it has been determined by the first determining unit that the size of the original image is not a predetermined size, block information about the block included in the original image mapped to a predetermined size; a storing unit configured to store the block information; a second input unit configured to input a comparison source image; a second extracting unit configured to extract block information about a block included in the comparison source image; and a comparing unit configured to compare the block information about the comparison source image with the block information about the comparison target image.

According to another aspect of the present invention, the creating unit creates block information about the block included in the original image mapped to a predetermined size by changing from the block information extracted by the first extracting unit to block information equivalent to that acquired by mapping the original image to a predetermined size.

According to yet another aspect of the present invention, the creating unit includes an image creating unit configured to create a mapped image by mapping the original image to a predetermined size; and a third extracting unit configured to extract block information about a block included in the mapped image having been created by the image creating unit, wherein the creating unit creates the block information having been extracted by the third extracting unit as block information about the block included in the original image mapped to a predetermined size.

Moreover, according to still yet another aspect of the present invention, the creating unit includes a scaling unit for scaling the original image; a processing unit for processing the original image; and an adding unit for adding a margin image to the original image, wherein the creating unit creates block information about the block included in the original image mapped to a predetermined size using at least one of the scaling unit, the processing unit, and the adding unit in accordance with the size of the original image.

Additionally, according to yet another aspect of the present invention, the creating unit includes a decision making unit configured to decide a fiducial position used for mapping the original image to a predetermined size, wherein the creating unit creates block information about the block included in the original image mapped to a predetermined size using the fiducial position that has been decided by the decision making unit in accordance with the size of the original image.

Furthermore, according to yet another aspect of the present invention, the comparing unit a first comparing unit configured to compare the block information about the comparison source image with the block information about the comparison target image in the relative coordinate system; and a second comparing unit configured to compare the block information about the comparison source image with the block information about the comparison target image in the absolute coordinate system.

Additionally, according to yet another aspect of the present invention, an image processing apparatus is provided for performing image similarity comparison processing. The apparatus includes a first input unit configured to input an original image that serves as a comparison target image; a first extracting unit configured to extract block information about a block included in the original image; a storing unit configured to store the block information; a second input unit configured to input a comparison source image; a second extracting unit configured to extract block information about a block included in the comparison source image; a first comparing unit configured to compare the block information about the comparison source image with the block information about the comparison target image in the relative coordinate system; and a second comparing unit configured to compare the block information about the comparison source image with the block information about the comparison target image in the absolute coordinate system.

According to another aspect of the present invention, at least one of the first and second comparing unit performs processing in accordance with the size of the comparison source image. According to another aspect of the present invention, the image processing apparatus may also include a second determining unit configured to determine whether the size of the comparison source image is a predetermined size, wherein at least one of the first and second comparing unit performs processing in accordance with the result of the determination by the second determining unit.

According to another aspect of the present invention, the second comparing unit performs processing when it has been determined that the size of the comparison source image is not a predetermined size by the second determining unit. Moreover, according to another aspect of the present invention, the block information extracted by the first and second extracting unit is block information based on the absolute and relative coordinate systems.

And, according to another aspect of the present invention, the image processing apparatus may further include a size information storing unit configured to, when the block information extracted by the first and second extracting unit is block information based on the absolute coordinate system, store paper size information about the comparison target image; and a block information creating unit configured to create block information based on the relative coordinate system on the basis of the block information based on the absolute coordinate system and the paper size information.

Furthermore, according to another aspect of the present invention, the image may also include a size information storing unit configured to, when the block information extracted by the first and second extracting unit is block information based on the relative coordinate system, store paper size information about the comparison target image; and a block information creating unit configured to create block information based on the absolute coordinate system on the basis of the block information based on the relative coordinate system and the paper size information. Additionally, according to another aspect of the present invention, the image processing apparatus may further include a specifying unit configured to specify the predetermined size.

Still further, according to another aspect of the present invention, a control method is provided for controlling an image processing apparatus that performs image similarity comparison processing. The method may include inputting an original image that serves as a comparison target image; extracting block information about a block included in the original image; determining whether the size of the original image is a predetermined size; when it has been determined in the first determining step that the size of the original image is not a predetermined size, creating block information about the block included in the original image mapped to a predetermined size; inputting a comparison source image; extracting block information about a block included in the comparison source image; and comparing the block information about the comparison source image with the block information about the comparison target image.

And, according to yet another aspect of the present invention, a control method is provided for controlling an image processing apparatus that performs image similarity comparison processing. The method includes inputting an original image that serves as a comparison target image; extracting block information about a block included in the original image; inputting a comparison source image; extracting block information about a block included in the comparison source image; comparing the block information about the comparison source image with the block information about the comparison target image in the relative coordinate system; and comparing the block information about the comparison source image with the block information about the comparison target image in the absolute coordinate system.

Moreover, according to yet another aspect of the present invention, a computer readable medium is provided for containing computer executable instructions for performing image similarity comparison processing. Here, the computer readable medium includes computer-executable instructions for inputting an original image that serves as a comparison target image; computer-executable instructions for extracting block information about a block included in the original image; computer-executable instructions for determining whether the size of the original image is a predetermined size; computer-executable instructions for, when it has been determined in the first determining step that the size of the original image is not a predetermined size, creating block information about the block included in the original image mapped to a predetermined size; computer-executable instructions for inputting a comparison source image; computer-executable instructions for extracting block information about a block included in the comparison source image; and computer-executable instructions for comparing the block information about the comparison source image with the block information about the comparison target image.

Also, according to yet another aspect of the present invention, a computer readable medium is provided containing computer executable instructions for performing image similarity comparison processing. Here, the computer readable medium includes computer-executable instructions for inputting an original image that serves as a comparison target image; computer-executable instructions for extracting block information about a block included in the original image; computer-executable instructions for inputting a comparison source image; computer-executable instructions for extracting block information about a block included in the comparison source image; computer-executable instructions for comparing the block information about the comparison source image with the block information about the comparison target image in the relative coordinate system; and computer-executable instructions for comparing the block information about the comparison source image with the block information about the comparison target image in the absolute coordinate system.

Further features of the present invention will become apparent from the following description of exemplary embodiments with reference to the attached drawings.

BRIEF DESCRIPTION OF THE DRAWINGS

FIG. 4 is a diagram showing exemplary document information according to an embodiment of the present invention.

FIG. 5 is a diagram showing exemplary block information according to an embodiment of the present invention.

FIGS. 6A through 6K are diagrams showing exemplary images acquired by mapping an input image to a standard paper size according to an embodiment of the present invention.

FIG. 7 is a diagram showing exemplary text feature quantity information according to an embodiment of the present invention.

FIG. 8 is a diagram showing exemplary image feature quantity information according to an embodiment of the present invention.

FIG. 10 is a diagram showing an exemplary configuration of a list of potential original documents according to an embodiment of the present invention.

FIGS. 17A through 17D are diagrams showing exemplary image sizes used in a layout retrieval operation according to an embodiment of the present invention.

FIGS. 18A through 18C are diagrams showing exemplary image sizes used in a layout retrieval operation according to an embodiment of the present invention.

FIG. 23 is a diagram showing an exemplary user interface for setting a standard paper size according to an embodiment of the present invention.

FIGS. 24A and 24B are diagrams for describing the background of the present invention.

DESCRIPTION OF THE EMBODIMENTS

Embodiments of the present invention will be described, by way of example only, with reference to the accompanying drawings.

Figure 1:
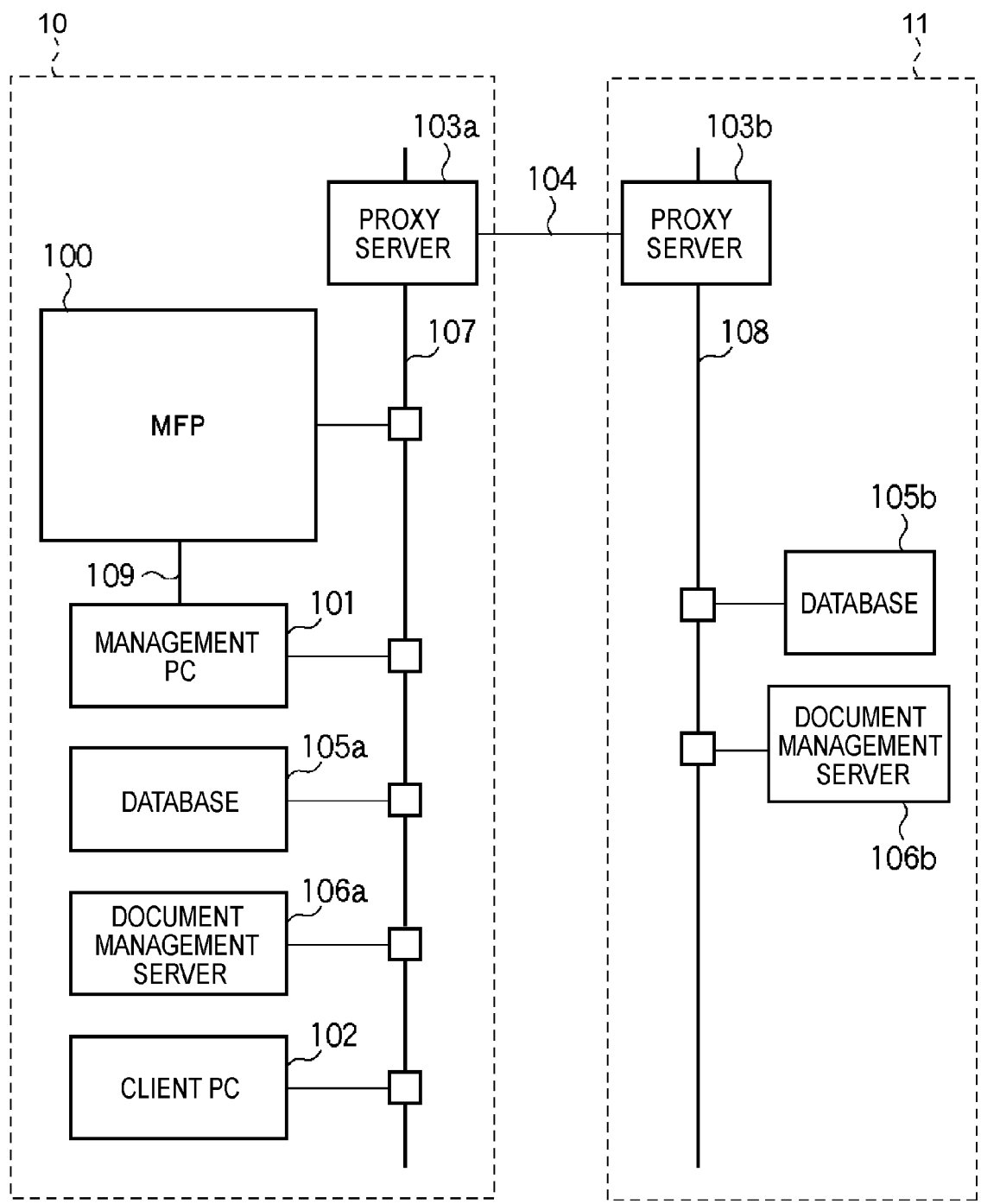
FIG. 1 is a block diagram showing a configuration of an image processing system according to an embodiment of the present invention.

FIG. 1 is a block diagram showing a configuration of an image processing system according to an embodiment of the present invention. The image processing system is implemented in an environment where offices 10 and 11 are connected by a network 104 such as the Internet.

A LAN 107 constructed in the office 10 is connected to an MFP (Multifunction Peripheral) 100 that serves as a multifunction machine capable of achieving various functions, a management PC 101 for controlling the MFP 100, a client PC 102, a document management server 106a, a database 105a for the document management server 106a, and a proxy server 103a.

A LAN 108 constructed in the office 11 is connected to a document management server 106b, a database 105b for the document management server 106b, and a proxy server 103b.

The LAN 107 in the office 10 and the LAN 108 in the office 11 are connected to the network 104 via the proxy servers 103a and 103b, respectively. The MFP 100 includes an image scanning unit for electronically scanning paper documents and an image processing unit for performing image processing upon an image signal obtained from the image scanning unit, and can transmit the image signal to the management PC 101 via a LAN 109.

The management PC 101 serving as a general personal computer (PC) includes various components such as an image memory unit, an image processing unit, a display unit, and an input unit. Some of these components are integrated into the MFP 100.

The network 104 typically serves as one of the Internet, a LAN, a WAN, a telephone line, a dedicated digital line, an ATM, a frame relay line, a communication satellite line, a cable television line, and a data broadcasting radio channel. Alternatively, the network 104 may be implemented by the combination thereof as a communication network capable of exchanging data.

Various terminals such as the management PC 101, the client PC 102, and the document management servers 106a and 106b individually include standard components (e.g., a CPU, a RAM, a ROM, a hard disk, an external memory, a network interface, a display, a keyboard, and a mouse) that a general-purpose computer has.

The detailed configuration of the MFP 100 will be described with reference to FIG. 2 which is a block diagram showing the detailed configuration of the MFP 100 according to an embodiment of the present invention.

Figure 2:
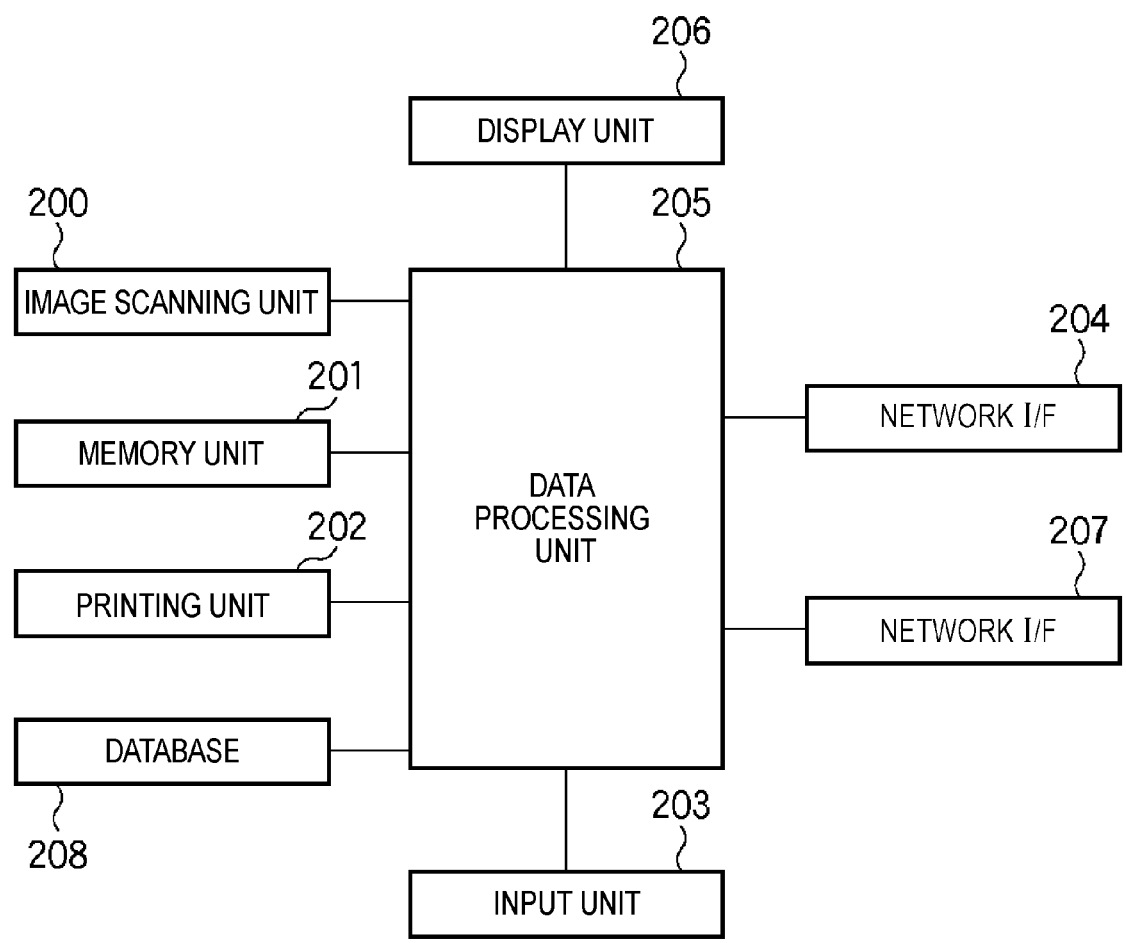
FIG. 2 is a block diagram showing a detailed configuration of an MFP according to an embodiment of the present invention.

Referring to FIG. 2, an image scanning unit 200 including a platen glass and an auto document feeder (ADF) exposes the image of a batch of originals or a single original to light from a light source (not shown), and forms the reflected image of the one or more originals on a solid-state imaging device using a lens, thereby obtaining a raster image reading signal from the solid-state imaging device as a raster image that has a predetermined density (for example, 600 dpi).

This embodiment will be described using the case where a paper document is used as printing material to be read by the image scanning unit 200 by way of example, but another printed material including a recording medium other than paper (e.g., an OHP sheet, a transparency such as a film, and fabric) may be used.

The MFP 100 has a copy function for copying an image corresponding to an image scanning signal on a recording medium, using a printing unit 202 thereof. When a single copy of an original image is made, an image scanning signal of the original image is processed by a data processing unit 205, whereby a recording signal is generated. Subsequently, an image corresponding to the recording signal is printed on a recording medium by the printing unit 202. On the other hand, when a plurality of copies of an original image are made, a recording signal for a single copy of the original image is temporarily stored in a memory unit 201. After that, the recording signal is repeatedly output to the printing unit 202, and, in parallel with this, an image corresponding to the recording signal is repeatedly printed by the printing unit 202, whereby a plurality of copies of the original image can be obtained.

On the other hand, a recording signal output from the client PC 102 is received by the data processing unit 205 via the LAN 107 and a network I/F 204. The data processing unit 205 converts the recording signal into raster data recordable by the printing unit 202. After that, the printing unit 202 prints an image corresponding to the raster data on a recording medium.

An instruction from an operator to the MFP 100 is input from an input unit 203 configured with a key operation unit provided to the MFP 100, and a keyboard and a mouse that are attached to the management PC 101. A series of instruction operations are controlled by a control portion (not shown) included in the data processing unit 205. An operation input status and in-process image data are displayed on a display unit 206. The memory unit 201 is also controlled by the management PC 101. The exchange and control of data between the MFP 100 and the management PC 101 are performed via a network I/F 207 and the LAN 109.

A database 208 registers and manages a paper document image having been read by the image scanning unit 200, information about the paper document image, and information about an electronic document image stored in a hard disk in the client PC 102 or the database 105*a* or 105*b* provided to the document management server 106*a* or 106*b* in the office 10 or 11.

In the MFP 100, a user interface that allows a user to input various operations and allows the MFP 100 to display various pieces of information so that various processing operations to be described later can be performed is implemented by the input unit 203 and the display unit 206.

There are two main processing operations performed in an image processing system according to an embodiment of the present invention, namely, a registration processing operation for registering image data and a retrieval processing operation for retrieving desired image data.

In this embodiment, in order to increase the processing efficiency of the entire image processing system, various processing operations to be described later are performed by various terminals that configure the image processing system, in a distributed manner. However, these processing operations may be performed by a single terminal (for example, the MFP 100).

[Exemplary Registration Processing]

First, an exemplary registration processing will be described. Target image data is registered using one of the methods of: registering image data acquired by scanning a paper document; and registering image data of a raster image into which an electronic document produced by unit of a document creation application or the like has been converted.

Figure 3:
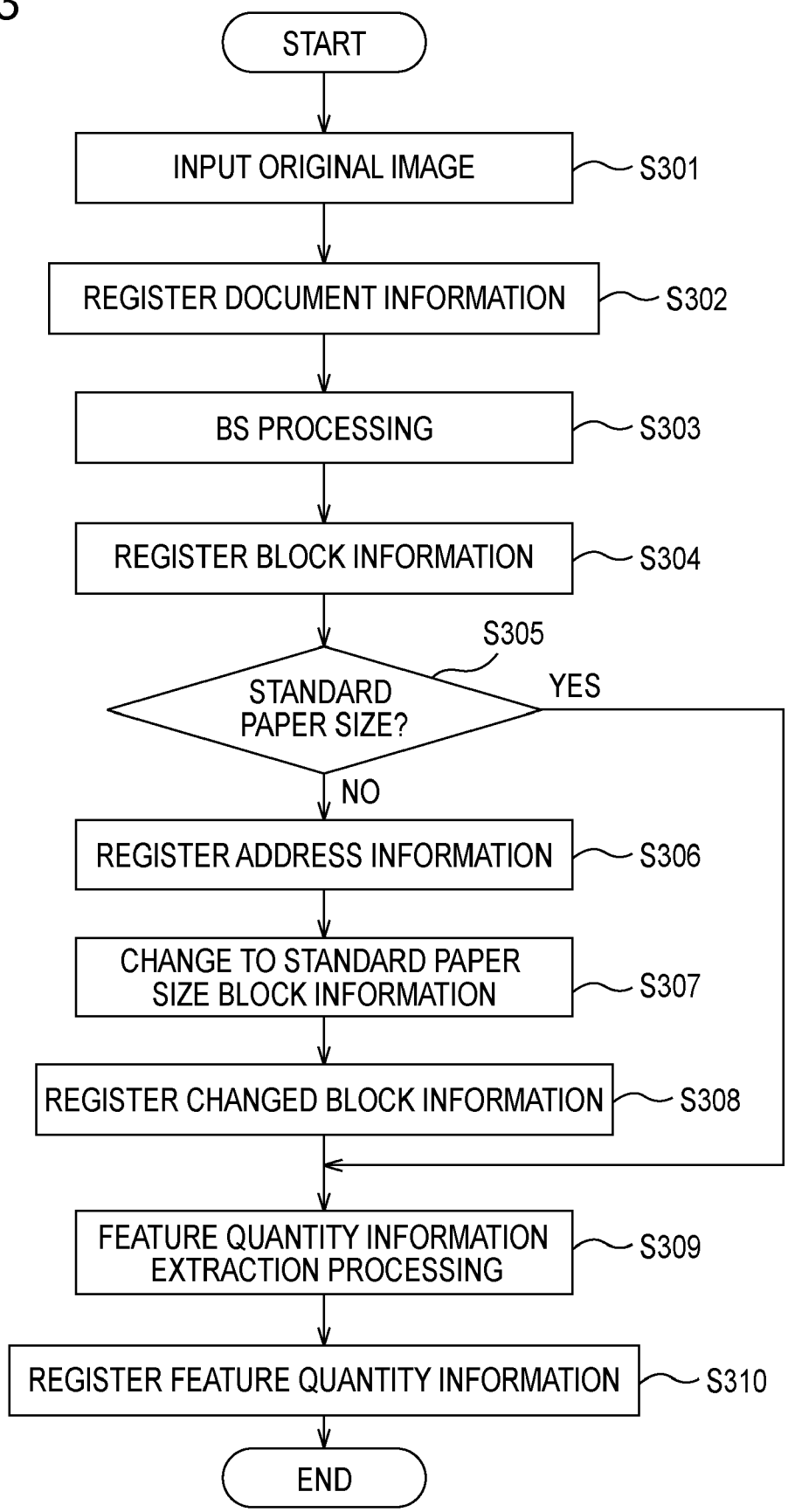
FIG. 3 is a flowchart showing registration processing according to an embodiment of the present invention.

The outline of the registration processing for registering an original document will be described with reference to FIG. 3 which is a flowchart showing registration processing according to an embodiment of the present invention.

First, a process starts after a paper document to be registered is placed in the ADF included in the image scanning unit 200, and a registration button in the input unit 203 is operated. The paper document to be registered may have one page or a plurality of pages. When the paper document has a plurality of pages, image data (page images) acquired from the paper document is managed as a single file. In step S301, the original document to be registered is input. In parallel with the input operation, various pieces of information for managing the original document are generated and stored in the memory unit 201.

There are two types of methods of inputting the original document in the original document registration processing.

When the original document is electronic data, the electronic data of the original document to be registered is read out from a position where it has been stored, and is input into the data processing unit 205 via the network I/F 204, and is then converted into a raster image by the data processing unit 205. The electronic data is stored in a hard disk included in the client PC 102, the database 105*a* or 105*b* included in the document management server 106*a* or 106*b* in the office 10 or 11, or the memory unit 201 included in the MFP 100.

On the other hand, when the original document is a paper document, the paper document is raster-scanned by the image scanning unit 200 included in the MFP 100, whereby a raster image can be obtained.

Thus, both electronic data and a paper document can be processed as an original document to be registered in this embodiment.

Next, in step S302, the raster image is preprocessed by the data processing unit 205 and is then stored in the memory unit 201 (when the original document is a paper document, in the succeeding process, the raster image will be used as the electronic data of the original document). At this time, a unique document ID is provided to each original document to be registered, and is associated with address information that represents the storage location of the electronic data of the original document, and is then registered along with paper size information (the pixel value of an image: the size of an input image) in the database 208 as document information.

The document ID is used for identifying an electronic document stored in the database 208. When an electronic document is registered, the electronic document is provided with a document ID that does not match other document IDs used. The address information is full path information that represents a storage location of electronic data. The full path information includes a URL, a server name, a directory, and a file name. An example of the document information is shown in FIG. 4. The document information is stored in the database 105a or 105b, the memory unit 201, or the like.

When the original document is a paper document, for example, the BMP format is employed as the file format for electronic data. However, the file format may be any file format (e.g. GIF or JPEG) that enables color information storage. On the other hand, when the original document is electronic data, the file format depending on an application used for producing the electronic data is employed. For example, the file format includes MS-Word (*.doc) supplied from Microsoft Corporation, Acrobat® (*.pdf) supplied from Adobe Systems Incorporated, etc.

In step S303, block selection (BS) processing is performed. This processing is performed under the control of the management PC 101. More specifically, a CPU included in the management PC 101 divides the raster image of the original document to be processed, which is stored in the memory unit 201, into a text/line art part and a halftone image part. Subsequently, the CPU further divides the text/line art part on a paragraph-based block-by-block basis, or a table-by-table or picture-by-picture basis, the table and picture being formed by lines.

The halftone image part is divided into an image part of separated rectangular blocks and a background part of separated rectangular blocks. Next, a block ID for identifying the page number of a page to be processed and each block on the page is provided.

In step S304, the block ID is associated with a corresponding block's attribute (image, text, or the like), size, position (coordinates in the page) in the original document, and the corresponding block, and is then stored (registered) in the database 208 as block information. An example of this block information is shown in FIG. 5.

In step S305, it is determined whether the input image size is a predetermined size (standard paper size. Here, the standard paper size unit a paper size usually used (most frequently used) in the MFP 100 of an image processing apparatus. In this embodiment, A4 size is defined as the standard paper size. When the input image size is the standard paper size (YES in step S305), the process proceeds to step S309. On the other hand, when the input image size is not the standard paper size (NO in step S305), the process proceeds to step S306. In step S306, a new document ID is provided to the original document to be processed, and, the paper size for the original document is set to the standard paper size. This information is stored in the database 208 as document information. In this case, as shown in FIG. 4, two or more document IDs are provided to the same image.

In step S307, the block information of the original document is changed in accordance with the standard paper size and is then registered. More specifically, the block information is changed from the block information having been created in step S303 to the block information equivalent to that acquired by mapping the input image to the standard paper size and performing the block selection processing on the image obtained from the mapping operation.

The image (mapped image) acquired by mapping the input image to the standard paper size is generated by adding a margin on the left and right/top and bottom of the input image, enlarging or reducing (scaling) the input image, or cutting (cropping) the part that goes out of the range of the standard paper size.

Here, exemplary mapped images are shown in FIGS. 6A through 6K. The mapped images shown in FIGS. 6B through 6H are generated from an input image shown in FIG. 6A, the size of the input image being smaller than the standard paper size. On the other hand, the mapped images shown in FIGS. 6J and 6K are generated from an input image shown in FIG. 6I, the size of the input image being larger than the standard paper size.

More specifically, the mapped image shown in FIG. 6B is acquired by mapping the input image shown in FIG. 6A to a standard paper size and adding a margin on the left, right, top, and bottom of the input image. The mapped image shown in FIG. 6C is acquired by enlarging the input image shown in FIG. 6A, and mapping the enlarged input image to the standard paper size, and then adding a margin on the left and right of the enlarged mapped input image. The mapped image shown in FIG. 6D is acquired by mapping the input image shown in FIG. 6A to the standard paper size so that the upper left corner of the input image can be positioned on the upper left corner of the standard paper size, and then adding a margin on the right and bottom of the input image. The mapped image shown in FIG. 6E is acquired by enlarging the input image shown in FIG. 6A, and mapping the enlarged input image to the standard paper size so that the upper left corner of the enlarged input image can be positioned on the upper left corner of the standard paper size, and then adding a margin on the right of the enlarged mapped input image.

The mapped image shown in FIG. 6F is acquired by enlarging the input image shown in FIG. 6A and mapping the enlarged input image to the size slightly smaller than the standard paper size, and then adding a margin on the left and right of the enlarged mapped input image. The mapped image shown in FIG. 6G is acquired by mapping the input image shown in FIG. 6A to the standard paper size so that the upper left corner of the input image can be positioned slightly inside the upper left corner of the standard paper size, and adding a margin on the right and bottom of the input image. The mapped image shown in FIG. 6H is acquired by enlarging the input image shown in FIG. 6A and mapping the enlarged input image to a size slightly smaller than the standard paper size so that the upper left corner of the enlarged input image can be positioned slightly inside the upper left corner of the standard paper size, and then adding a margin on the right of the enlarged mapped input image.

The mapped image shown in FIG. 6J is acquired by mapping the input image shown in FIG. 6I to the standard paper size and cutting the part that goes out of the range of the standard paper size. The mapped image shown in FIG. 6K is acquired by reducing the input image shown in FIG. 6I and mapping the reduced input image to the standard paper size, and then adding a margin on the left and right of the reduced mapped input image.

Thus, in this embodiment, the original image is mapped to a predetermined size (standard paper size) without being scaled, and then a margin is added as appropriate, and/or the part that goes out of the range of the predetermined size is cut as appropriate. Alternatively, the original image is scaled and mapped so that the scaled original image can fit into the standard paper size leaving the smallest possible margin, and then a margin is added as appropriate.

In addition, the original image is mapped to the standard paper size so that the upper left corner or center of the original image can be positioned on the upper left corner or center of the standard paper size, respectively. This mapping fiducial position is not limited thereto, and may be a predetermined position, for example, the upper or lower right corner.

Now referring to FIG. 2, in step S307, the block information of the image acquired by mapping the input image to the standard paper size has been obtained by changing the block information, but may be obtained, for example, by the following procedure: first, producing an image by mapping the input image to the standard paper size; and next, performing the block selection processing upon the produced image.

The image mapped to the standard paper size in step S307 is obtained on the basis of an image obtained by printing a nonstandard-size input document on the standard-size paper.

This embodiment has been described by referring to the case where the image mapped to the standard paper size is obtained by centrally placing the input image on the standard-size paper. Although other cases can be considered where a mapped image is produced on the basis of other placements of the input image, these cases can also be processed in accordance with the same processing in this embodiment.

For example, an image may be printed not in the center of the paper but on the upper left side of the paper depending on the application setting. Therefore, examples have been shown where the mapped images (shown in FIGS. 6D and 6E) are obtained by placing the input image in accordance with the fiducial position of the upper left corner. Furthermore, there may be unprintable areas on the left, right, top, and bottom of the paper depending on the printer used. Therefore, examples have also been shown where the mapped images (shown in FIGS. 6F, 6G, and 6H) are obtained by placing the input image so that a predetermined amount of margin can be left on the left, right, top, and bottom of the paper.

In the case of a nonstandard-size image, in particular, in the case of an image not compliant with the A-series, B-series, or US-letter size, the printing result thereof tends to differ from the original image. In addition, when a US-letter-size original is printed on A4-size paper, or, in contrast, when an A4-size original is printed on US-letter-size paper, the printing result also tends to differ from the original image.

Accordingly, in this embodiment, not only the input images shown in FIGS. 6A and 6I, namely, original images, but also the block information of the mapped images shown in FIGS. 6B through 6H, 6J, and 6K are registered, whereby, when printed images having been printed under various printing conditions are used for layout comparison as original images (comparison source images), these images can be regarded as documents that have the same layout.

Next, in step S308, like step S304, a block ID for identifying a block upon which the block selection processing has been performed is provided to each changed block. The attribute (image, text, or the like), size, and position (coordinates) in the original document are associated with a corresponding block and are then stored (registered) in the database 208 as block information.

In step S309, feature quantity information extraction processing for extracting the feature quantity information of each block is performed by the data processing unit 205 in accordance with the type of each block.

In particular, in the case of a text block, a character code having been extracted by performing OCR processing upon the text block is defined as a text feature quantity. In the case of an image block, an image feature quantity regarding brightness and color is extracted. In step S310, feature quantities corresponding to individual blocks are brought together on an original document-by-document basis, and are individually associated with corresponding document IDs, page numbers, and block IDs, and are then stored (registered) in the database 208 as feature quantity information. Exemplary text and image feature quantities are shown in FIGS. 7 and 8, respectively.

[Exemplary Retrieval Processing]

Figure 9:
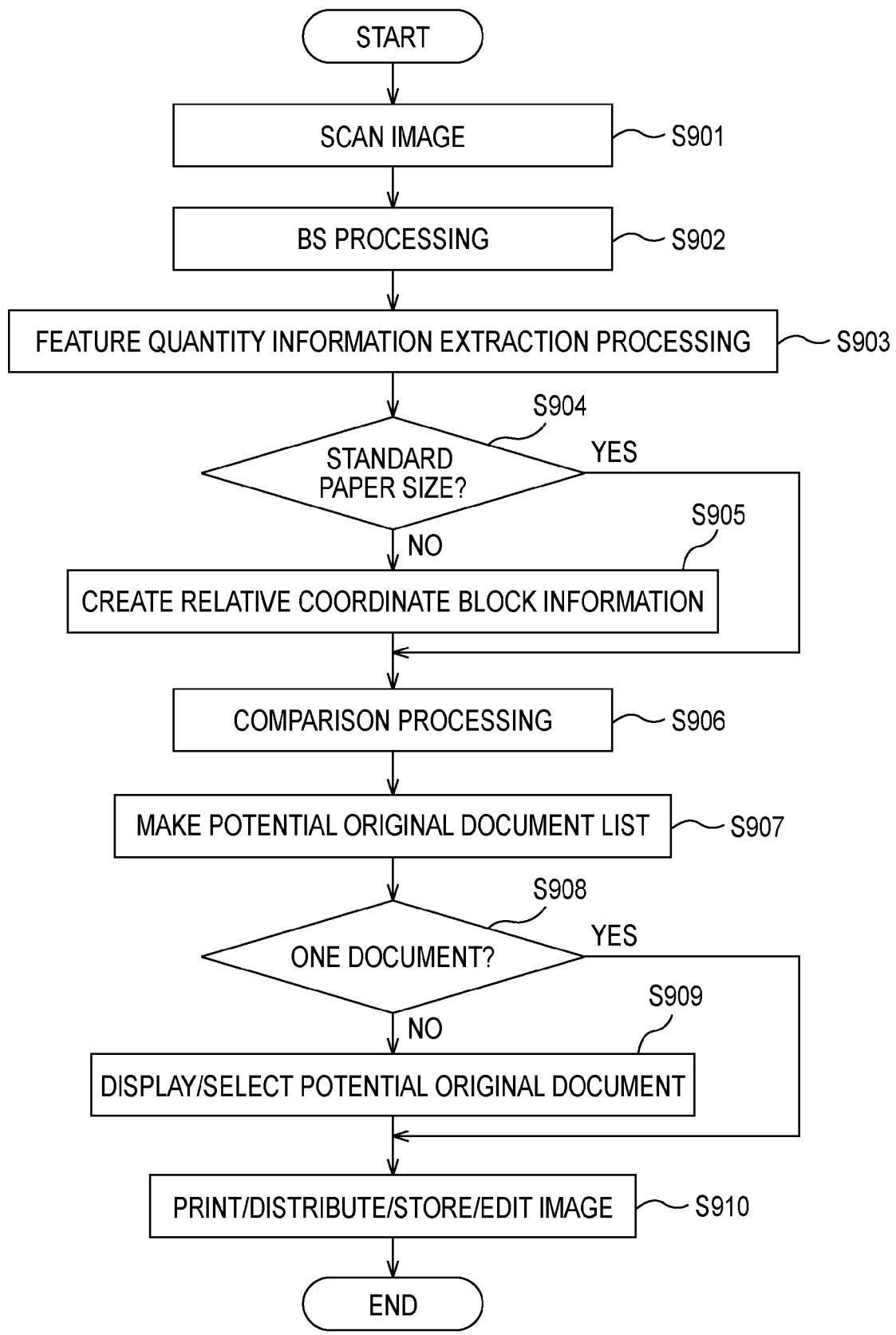
FIG. 9 is a flowchart showing retrieval processing according to an embodiment of the present invention.

The outline of retrieval processing for retrieving electronic data of an original document will be described with reference to FIG. 9 which is a flowchart showing the retrieval processing according to an embodiment of the present invention.

First, in step S901, a paper document to serve as a retrieval condition is input. Since this processing is the same as that in step S301, the description thereof will be omitted. However, a raster image generated by this processing is merely temporarily stored, so address information for the paper document is not required to be stored in the memory unit 201.

In step S902, the block selection (BS) processing is performed upon an image area in the raster image. Since the block selection processing is the same as that in step S303, the description thereof will be omitted. However, the attribute, size, and position of each block generated by this block selection processing are merely temporarily stored, so block information for the paper document is not required to be stored in the memory unit 201.

In step S903, the feature quantity information extraction processing for extracting the feature quantity information of each block is performed. Since this processing is the same as that in step S309, the description thereof will be omitted. However, each block's feature quantity information generated by this processing is merely temporarily stored, so feature quantity information for the paper document is not required to be stored in the memory unit 201.

In step S904, it is determined whether the paper size of the paper document having been input (input image) is the standard paper size. When the paper size of the input image is the standard paper size (YES in step S904), the process proceeds to step S906. On the other hand, when the paper size of the input image is not the standard paper size (NO in step S904), the process proceeds to step S905.

In step S905, the paper size of the paper document having been input (input image) is normalized, and the position and size information of the corresponding block information are corrected in accordance with the normalized paper size, whereby normalized block information (block information based on the relative coordinate system) is produced.

In step S906, the block information and feature quantity information of the paper document (comparison source image) having been input are respectively compared with the block information and feature quantity information of the original document (comparison target image) corresponding to the document ID of the electronic document stored in the database 208.

In step S907, a list of potential original documents is made on the basis of the comparison result. The list includes the document IDs and similarity levels of the potential original documents. When the similarity level of a document is below a predetermined threshold value, the document is deleted from the list. When a plurality of document IDs refer to the same potential original document in the list, the highest-similarity-level document ID is retained, and other document IDs are deleted. FIG. 10 is a diagram showing an exemplary configuration of the list of potential original documents according to an embodiment of the present invention.

In step S908, it is determined whether the number of documents in the list of potential original documents is one. When the number is one (YES in step S908), the process proceeds to step S910. On the other hand, when the number is two or more (No in step S908), the process proceeds to step S909.

In step S909, thumbnail images of the documents registered in the list are displayed as potential original documents. More specifically, a user interface including the thumbnail images of the potential original images is composed of the display unit 206 and the input unit 203. The display or selection of the potential original images is performed using the user interface.

After the thumbnail images of the potential original documents are displayed on the display unit 206, a user selects a desired thumbnail image from among the thumbnail images of the potential original documents. When the original document is selected using the user interface, the document ID thereof is specified. The configuration of the user interface will be described in detail later.

In step S910, the selected original document (electronic file or image data) is read in the memory unit 201 by referring to an address corresponding to the document ID of the selected original document in the database 208. The original document is printed, distributed, stored, or edited in accordance with the instructions of an operator.

The details of each type of processing will now be described.

[Exemplary Block Selection Processing]

The details of the block selection processing performed in steps S303 and S902 will be described. In the block selection processing, for example, a raster image 11A is recognized as having blocks containing meaningful information as shown in an image 11B. The attributes (TEXT/PICTURE/PHOTO/LINE/TABLE) of the blocks are individually determined so as to divide the raster image into blocks that have different attributes.

The block selection processing according to an embodiment of the present invention will be described. First, an input image is binarized into a monochrome image, and contour tracing is performed upon the binary image, whereby connected components of black pixels, each connected component being surrounded by a black pixel border, are extracted. In the case of large connected components of black pixels, contour tracing is also performed upon internal white pixels, whereby connected components of white pixels are extracted. Furthermore, connected components of black pixels are recursively extracted from connected components of white pixels which have a size greater than or equal to a predetermined area.

The connected components of black pixels obtained in accordance with the above-described process are classified by size and shape into blocks that have different attributes. For example, a block having an approximate predetermined aspect ratio (in the case of Japanese, an aspect ratio of 1:1) and a predetermined size is defined as a pixel connected component that represents a character. A part where adjacent characters are orderly arranged and so can be grouped is defined as a text block. A flat pixel connected component is defined as a line block. The range of a black pixel connected component that contains orderly arranged rectangular white pixel connected components, each having a predetermined size or more, is defined as a table block. The area where pixel connected components of indefinite shape scatter is defined as a photo block. A pixel connected component of another arbitrary shape is defined as a picture block.

[Exemplary Feature Quantity Information Extraction Processing]

The details of the feature quantity information extraction processing performed in steps S309 and S903 will be described. The feature quantity information extraction processing adopts different processing methods for an image block and a text block, so the methods will be separately described.

Figure 11:
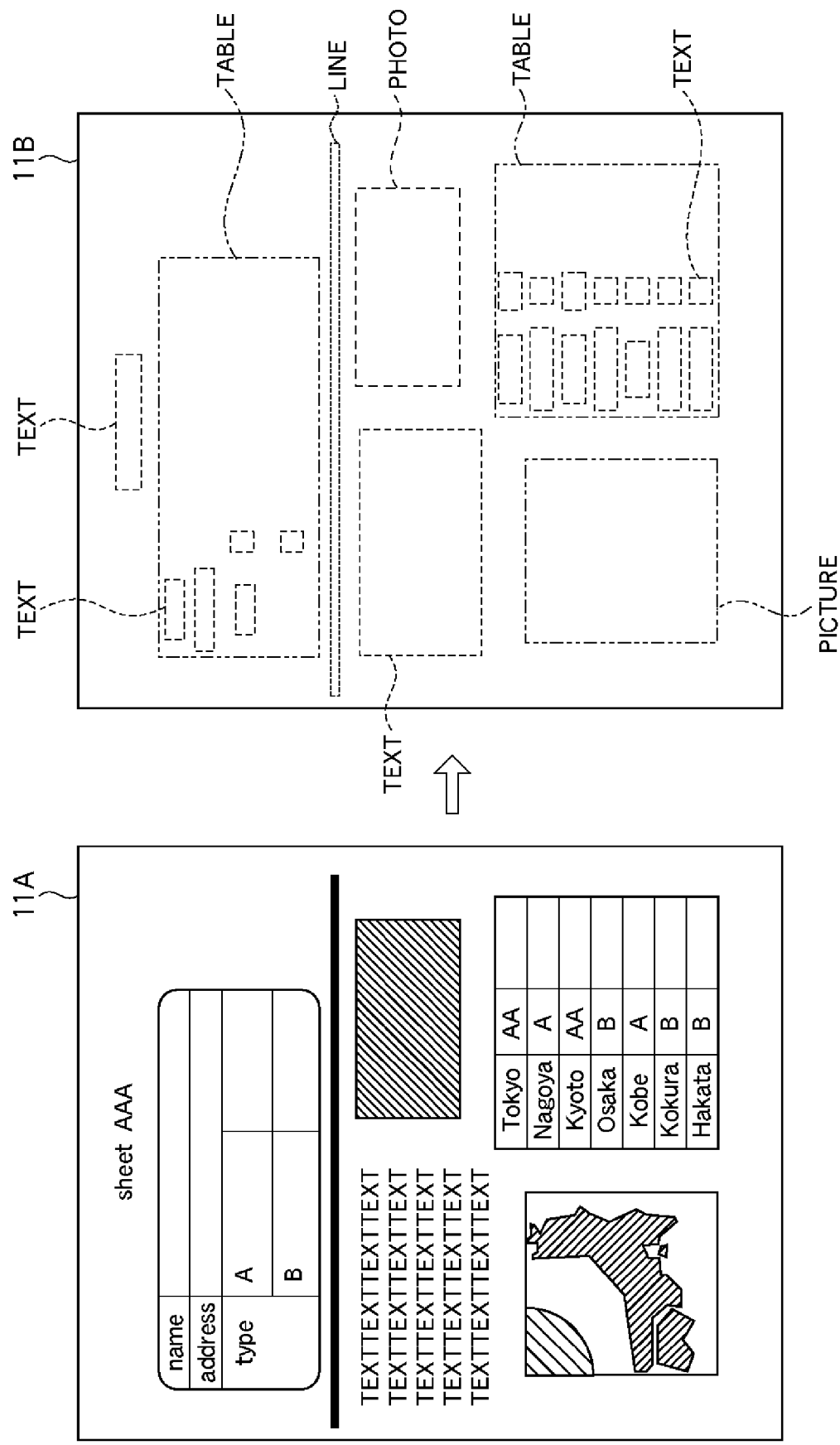
FIG. 11 is a diagram showing exemplary image block extraction processing according to an embodiment of the present invention.

Here, in the image 11B in FIG. 11, photo and picture blocks are defined as image blocks. However, at least one of the photo and picture blocks may be defined as an image block in accordance with an application or an intended purpose.

[Exemplary Feature Quantity Information Extraction Processing for Image Block]

Feature quantity information extraction processing for an image block will be described. When there is a plurality of image blocks in a single document, the following process is repeated a number of times corresponding to the number of image blocks.

Figure 12:
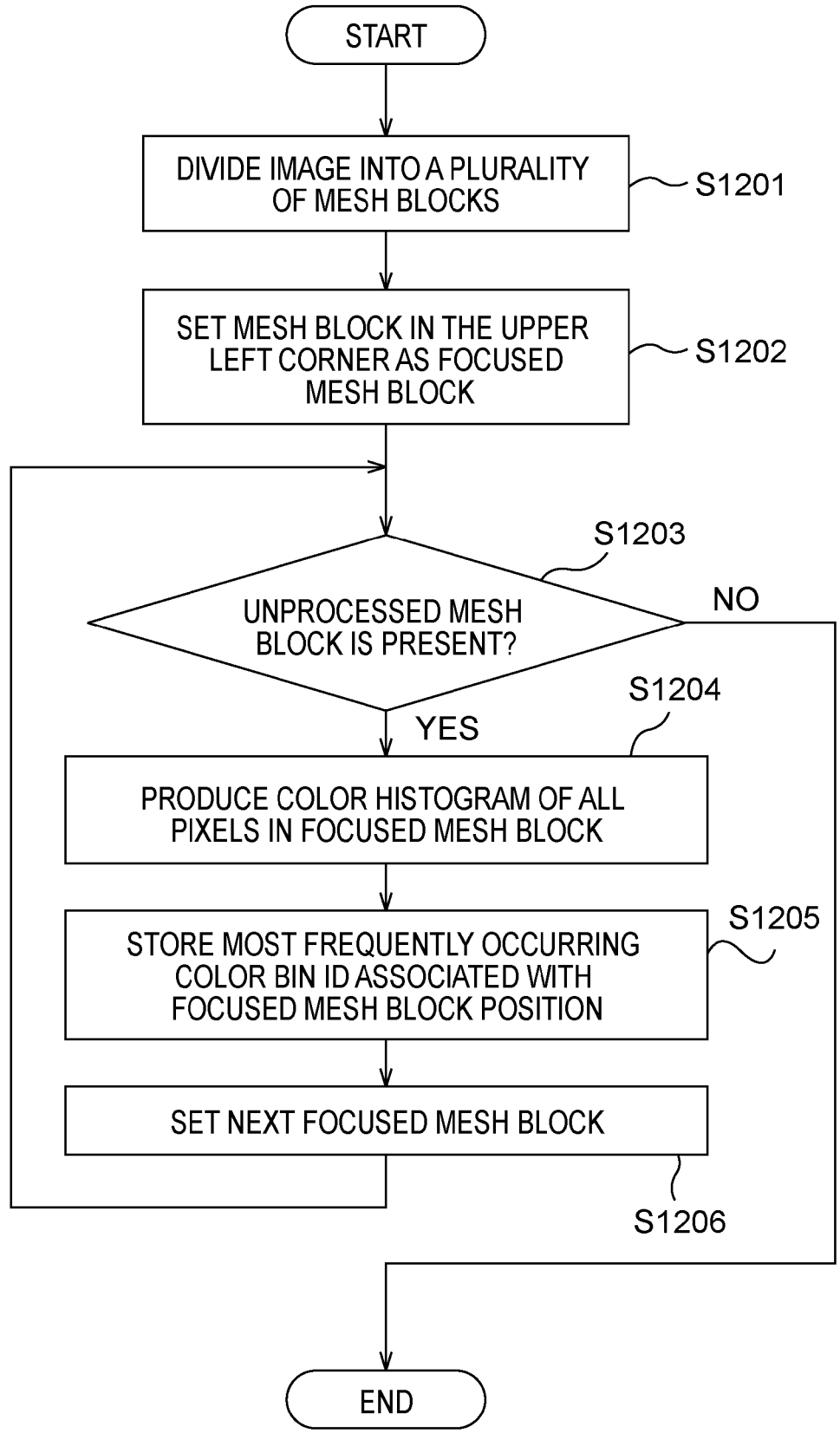
FIG. 12 is a flowchart showing the details of color feature quantity information extraction processing according to an embodiment of the present invention.

In this embodiment, for example, color feature quantity information extraction processing for extracting image color feature quantity is performed. The details of the color feature quantity information extraction processing will be described with reference to FIG. 12 which is a flowchart showing the details of color feature quantity information extraction processing according to an embodiment of the present invention.

An image to be processed is divided into a plurality of mesh blocks. In this process, the most frequently occurring color in the color histogram of each mesh block is associated with the position information of a corresponding mesh block and is then extracted as color feature information.

Figures 13, 14:
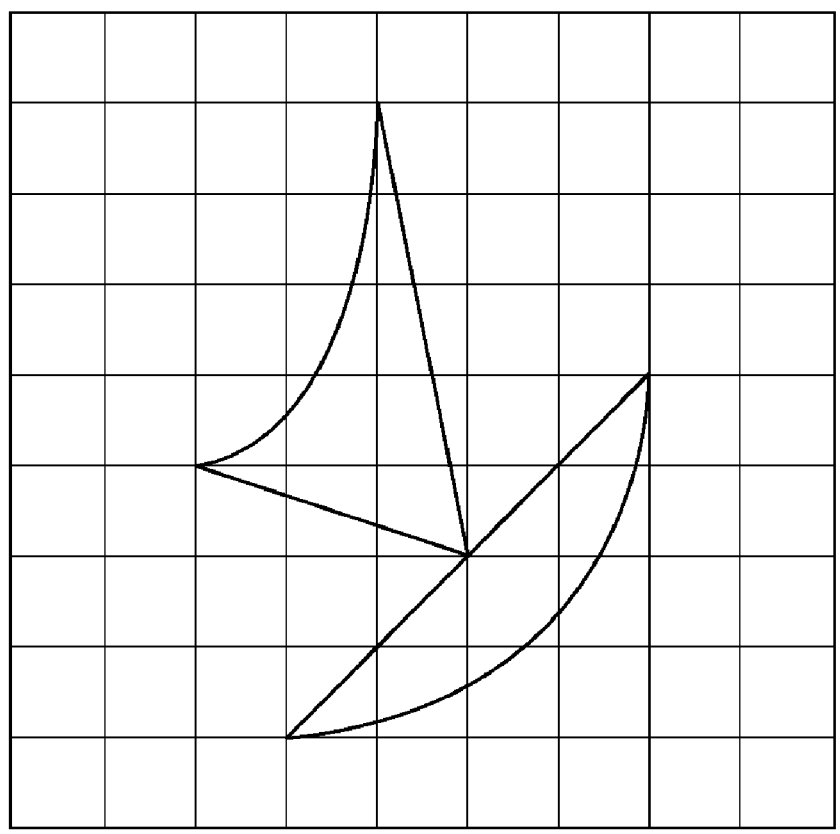
FIG. 13 is a diagram showing exemplary image mesh block division processing according to an embodiment of the present invention.
FIG. 14 is a diagram showing an exemplary sequence decision table according to an embodiment of the present invention.

In step S1201, an image is divided into a plurality of mesh blocks. As shown in FIG. 13, an image is divided into nine rows and nine columns of mesh blocks. Thus, in this embodiment, 9×9 mesh blocks=81 mesh blocks are used for convenience of explanation. However, in reality, it is desirable that, for example, approximately 15×15 mesh blocks=225 mesh blocks are used.

In step S1202, the block in the upper left corner is set as a focused mesh block to be processed. The setting of the focused mesh block is performed on the basis of a sequence decision table, for example, a table (3×3 mesh blocks are used by way of example) shown in FIG. 14, in which a processing sequence has been decided in advance. In FIG. 14, a scanning operation proceeds from the upper left corner to the upper right corner, and then from the left end to the right end in the second row, and similarly proceeds in the third row.

In step S1203, it is determined whether a focused mesh block that has not been processed yet is present. When an unprocessed focused mesh block is not present (NO in step S1203), the process ends. On the other hand, when an unprocessed observation mesh block is present (YES in step S1203), the process proceeds to step S1204.

Figure 15:
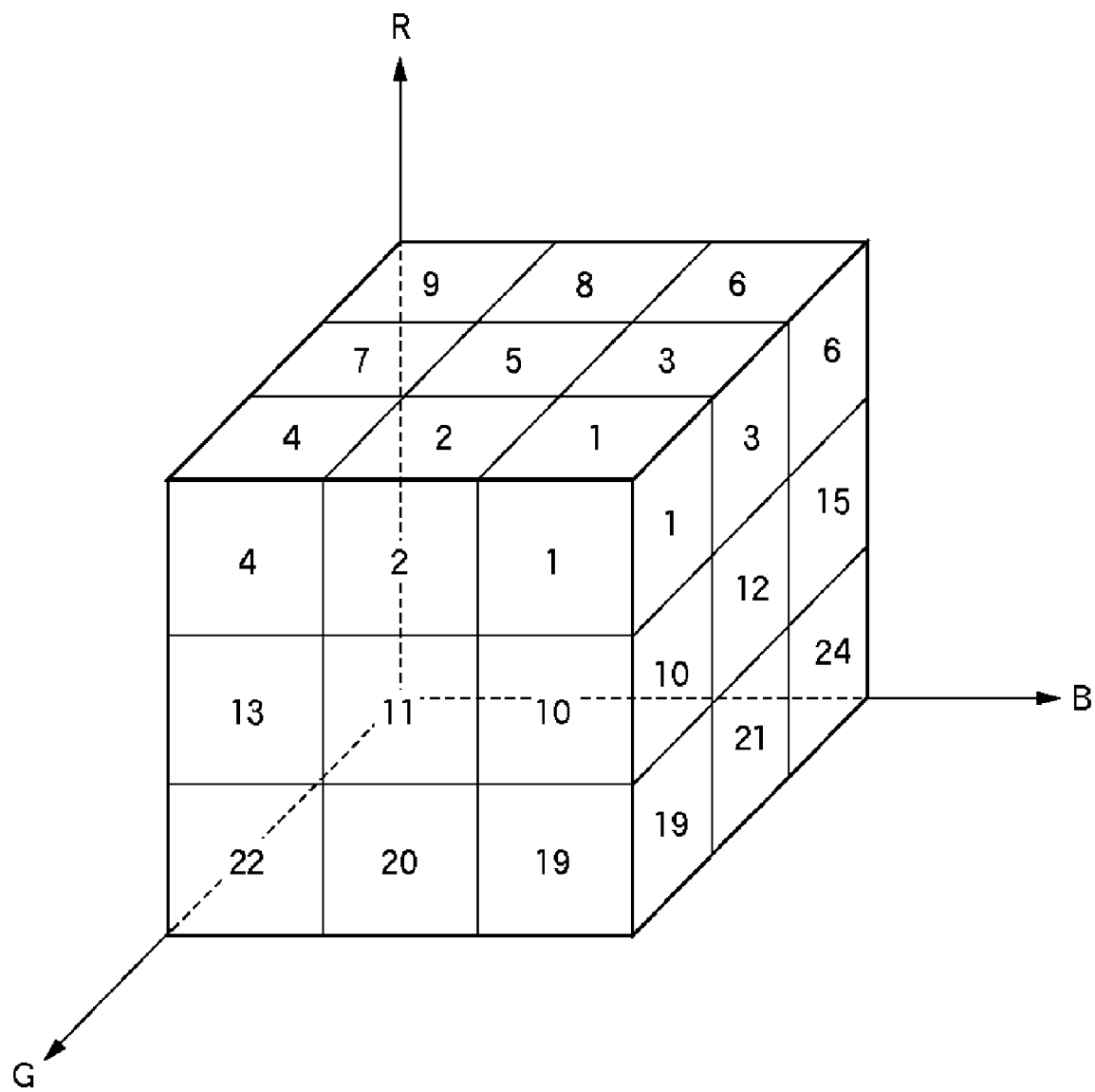
FIG. 15 is a diagram showing an exemplary arrangement of color bins in color space according to an embodiment of the present invention.

In step S1204, the density values of all pixels included in a focused mesh block are individually projected into color bins that serve as subspaces into which color space is divided as shown in FIG. 15, whereby a color histogram of color bins is produced.

In this embodiment, as shown in FIG. 15, RGB color space is divided into 3×3×3 color bins=27 color bins, and then the density values of all pixels included in a focused mesh block are individually projected into the color bins. However, another case may be adopted. In practice, for example, it is more desirable that the RGB color space is divided into 6×6×6 color bins=216 color bins, and then the density values of all pixels included in a focused mesh block are individually projected into the color bins.

In step S1205, the color bin ID of the color bin having the most frequently occurring color in the color histogram is decided as the representative color of the focused mesh block, and is associated with the focused mesh block and the position of the focused mesh block, and is then stored in the memory unit 201.

In step S1206, the next focused mesh block is set by referring to the sequence decision table shown in FIG. 14. After that, the process returns to step S1203, and then the process of steps S1203 through 1206 is repeated until no unprocessed focused mesh blocks is present.

According to the above-described process, information acquired by individually associating the representative colors of mesh blocks in an image (image block) to be processed with the positions of the mesh blocks, can be extracted as color feature quantity information.

[Exemplary Quantity Extraction Processing for Text Block]

Feature quantity extraction processing for a text block will now be described. When there is a plurality of text blocks in a single document, the following process is repeated a number of times corresponding to the number of text blocks.

The text feature quantity information for a text block is a character code acquired by performing OCR (optical character recognition) processing upon a text block. In the OCR processing, after character images are extracted from a text block on a character-by-character basis, character recognition processing is performed upon the extracted character images using a pattern matching method, whereby a character code corresponding to a character image is obtained.

In this character recognition processing, the feature of a character image is converted into a several ten-dimensional numerical sequence as an observation feature vector. Subsequently, the observation feature vector is compared with a dictionary feature vector having been calculated for each character type in advance. Consequently, a character type having the nearest dictionary feature vector to the observation feature vector is output as a character recognition result.

There are various known methods of extracting a feature vector. For example, one of those is a method using a mesh vector of a few dimensions which is acquired by dividing a character into a plurality of mesh blocks, and then counting the number of character lines included in each mesh block as linear elements on a direction-by-direction basis.

When the character recognition processing is performed upon the text block having been extracted by the block selection processing (step S309 or S903), it is determined which text direction, namely, either a horizontal or vertical text direction, the text box adopts. Subsequently, a character string is extracted from the text block in accordance with the direction corresponding to the determined text direction, and then characters are individually extracted from the character string, whereby the character image of each character is obtained.

The determination of the horizontal or vertical text direction is performed as follows. Horizontal and vertical projection is performed upon the pixel included in the text block. When the variance of the horizontal projection is large, it is determined that the text box adopts the horizontal text direction. When the variance of the vertical projection is large, it is determined that the text box adopts the vertical text direction. The division of the text box into character strings and characters is performed as follows. When the text box adopts the horizontal text direction, a row is extracted using the horizontal projection, and in addition, characters are then extracted by performing the vertical projection upon the extracted row. On the other hand, when the text box adopts the vertical text direction, processing in which the horizontal and vertical directions in the above-described processing are reversed is performed.

[Exemplary Comparison Processing]

Figure 16:
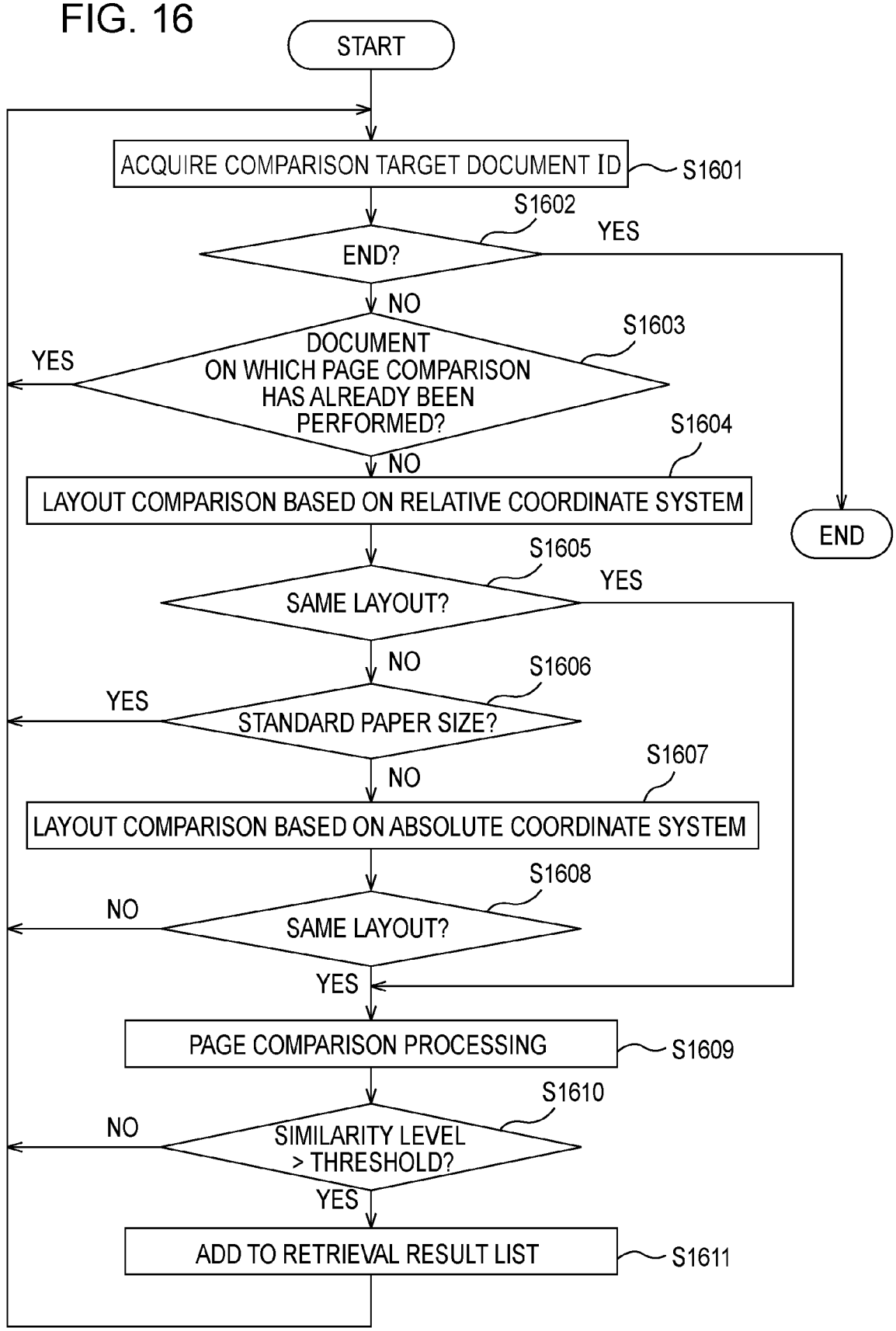
FIG. 16 is a flowchart showing the details of comparison processing according to an embodiment of the present invention.

The details of comparison processing performed in step S906 will be described with reference to FIG. 16 which is a flowchart showing the details of comparison processing according to an embodiment of the present invention.

In step S1601, document IDs for the list of potential original documents for managing comparison target documents are sequentially obtained from the top of the list. In step S1602, it is determined whether all document IDs have been obtained. When all document IDs have been obtained (YES in step S1602), the process ends. On the other hand, when all document IDs have not been obtained (NO in step S1602), the process proceeds to step S1603.

In step S1603, it is determined whether the obtained document ID of a comparison target document indicates a document upon which a page comparison has already been performed. In this embodiment, a plurality of document IDs may be assigned to a single document. In this case, the document IDs individually include different block information, but the block features thereof are the same. Accordingly, the comparison processing using document information included in another document ID of a document upon which a page comparison has already been performed, merely leads to redundant processing, and so is not required.

When the obtained document ID indicates a document upon which a page comparison has already been performed (YES in step S1603), the process returns to step S1601. On the other hand, when the obtained document ID represents a document upon which a page comparison has not been performed yet (NO in step S1603), the process proceeds to step S1604.

In step S1604, layout comparison based on the relative coordinate system is performed. Here, a layout includes the attribute, size, and position of a block included in block information. More specifically, the attributes, sizes, and positions of blocks in a comparison source image are respectively compared with the attributes, sizes, and positions of blocks included in block information corresponding to either the document ID acquired in step S1601 or an in-process page so as to determine whether the layouts are the same.

In this embodiment, each piece of block information shown in FIG. 5 includes position and size information represented using pixel values on the basis of the absolute coordinate system. Accordingly, an image to be processed is normalized using a paper size included in the document information shown in FIG. 4, and is then changed to the relative coordinate system. By performing layout comparison based on the relative coordinate system, even if an image is enlarged or reduced, the enlarged and reduced images can easily be regarded as images having the same layout as the original image layout. That is, the different-sized images shown in FIGS. 17A through 17D can be regarded as images having the same layout.

In step S1605, it is determined whether comparison source image (paper document) layout is the same as comparison target image (original document) layout in accordance with the layout comparison processing performed in step S1604. When they are the same (YES in step S1605), the process proceeds to step S1609. On the other hand, when they are not the same (NO in step S1605), the process proceeds to step S1606.

In step S1606, it is determined whether the paper size of the comparison source image is a standard paper size. When the paper size is not a standard paper size (NO in step S1606), the process proceeds to step S1607. On the other hand, when the paper size is a standard paper size (YES in step S1606), the process returns to step S1601.

In step S1607, layout comparison based on the absolute coordinate system is performed. In the layout comparison based on the relative coordinate system in step S1604, an image acquired by printing the original image on large-sized paper without scaling the original image is regarded as an image that has a different layout compared with the original image. However, in this layout comparison based on the absolute coordinate system, it can be regarded as an image that has the same layout compared with the original image. Accordingly, the layouts of images printed on various-sized paper shown in FIGS. 18A, 18B, and 18C can be regarded as the same.

In step S1608, it is determined whether the comparison source image (paper document) layout is the same as the comparison target image (original document) layout in accordance with the layout comparison processing performed in step S1607. When they are the same (YES in step S1608), the process proceeds to step S1609. On the other hand, when they are not the same (NO in step S1608), the process returns to step S1601.

In step S1609, page comparison processing for comparing pages of the comparison source image (paper document) and the comparison target image (original document) is performed. In this processing, integrative comparison is performed using a text feature quantity or an image feature quantity in accordance with a block attribute so as to calculate a similarity level. The details of this processing will be described later.

In step S1610, it is determined whether the calculated similarity level is equal to or larger than a predetermined threshold value. When the similarity level is less than the predetermined threshold value (NO in step S1610), the process returns to step S1601. On the other hand, when the similarity level is equal to or larger than the predetermined threshold value (YES in step S1610), the process proceeds to step S1611.

In step S1611, an in-process document ID and the similarity level thereof are added to a retrieval result list, and the process returns to step S1601.

[Exemplary Page Comparison Processing]

Figure 19:
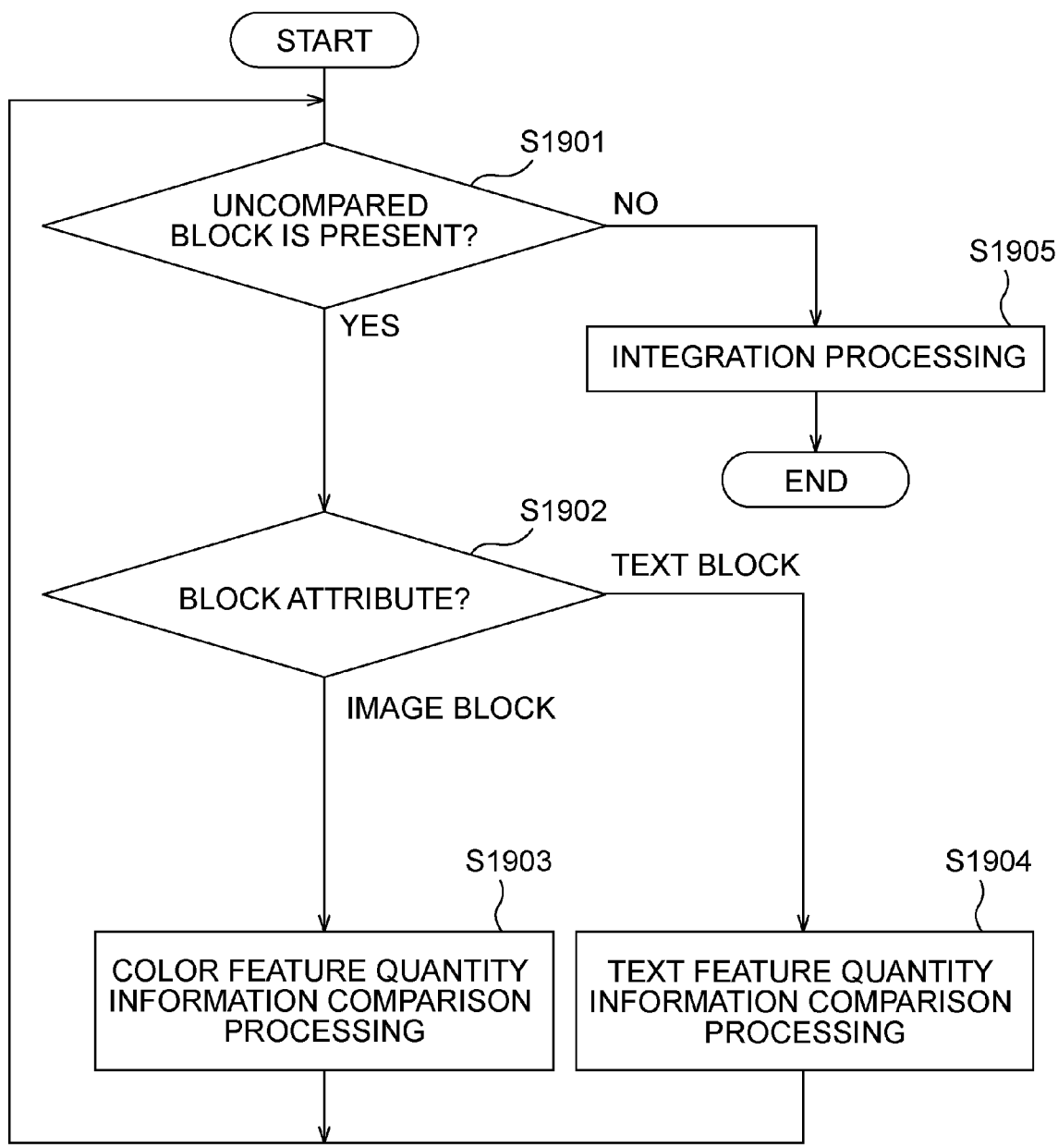
FIG. 19 is a flowchart showing the details of page comparison processing according to an embodiment of the present invention.

The details of the page comparison processing performed in step S1609 will be described with reference to FIG. 19 which is a flowchart showing the details of page comparison processing according to an embodiment of the present invention.

In step S1901, it is determined by referring to block information whether a block upon which the comparison processing has not been performed yet is present in electronic data corresponding to a document ID and a page number to be processed. When an uncompared block is not present (NO in step S1901), the process proceeds to step S1905. On the other hand, when an uncompared block is present (YES in step S1901), the process proceeds to step S1902.

In step S1902, the attribute of a block to be compared is determined. When the attribute indicates an image block, the process proceeds to step S1903. On the other hand, when the attribute indicates a text block, the process proceeds to step S1904.

When the attribute indicates an image block, in step S1903, color quantity information comparison processing for comparing the comparison source block with the comparison target block using color feature quantity information is performed. The details of this processing will be described later. The similarity level acquired by this processing is associated with the document ID, page number, and block ID of the comparison target document, and is then temporarily stored in the memory unit 201.

On the other hand, when the attribute indicates a text block, in step S1904, text feature quantity information comparison processing for comparing the comparison source block with the comparison target block using text feature quantity information is performed. The details of this processing will be described later. The similarity level acquired by this processing is associated with the document ID, page number, and block ID of the comparison target document, and is then temporarily stored in the memory unit 201.

Next, in step S1901, when the comparison processing has been performed upon all blocks (NO in step S1901), the process proceeds to step S1905. In step S1905, integration processing for calculating a similarity level between a paper document functioning as a retrieval condition (query) and a page in the original document is performed. In this processing, the similarity levels of all blocks included in a page of the comparison target document (original document (electronic data)) are integrated, the similarity levels of all blocks having been stored in the memory unit 201 in accordance with the processing performed in steps S1903 and S1904.

[Exemplary Color Feature Quantity Information Comparison Processing]

Figure 20:
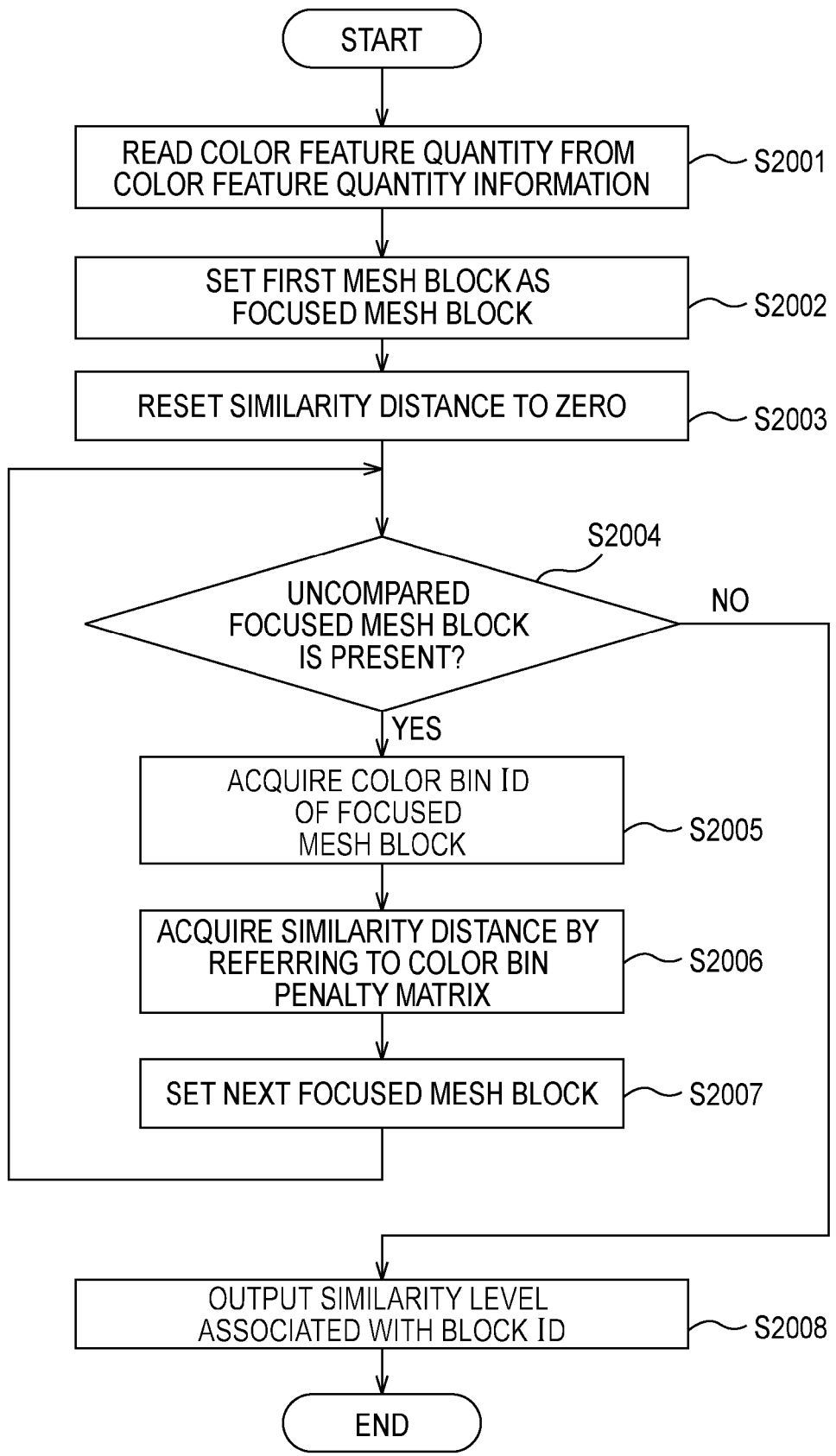
FIG. 20 is a flowchart showing the details of color feature quantity information comparison processing according to an embodiment of the present invention.

The details of the color feature quantity information comparison processing performed in step S1903 will be described with reference to FIG. 20 which is a flowchart showing the details of color feature quantity information comparison processing according to an embodiment of the present invention.

In step S2001, the color feature quantities of comparison source and target image blocks are individually read out from color feature quantity information. In step S2002, a mesh block corresponding to a first mesh block of the sequence decision table shown in FIG. 14 is set as a focused mesh block in an image block to be processed. In step S2003, a similarity distance representing a similarity level between color feature quantities of the comparison source and target image blocks is reset to zero.

In step S2004, it is determined whether a focused mesh block upon which comparison processing has not been performed yet is present. When an uncompared focused mesh block is not present (NO in step S2004), the process proceeds to step S2008. On the other hand, when an uncompared focused mesh block is present (YES in step S2004), the process proceeds to step S2005.

In step S2005, the color bin IDs of the focused mesh blocks in the comparison source and target images are individually acquired from color feature quantities of the comparison source and target images. In step S2006, a local similarity distance between focused mesh blocks, namely, between acquired color bin IDs, is obtained by referring to a color bin penalty matrix shown in FIG. 21. The obtained local similarity distance is added to a similarity distance having been acquired in the preceding process. The similarity distance is then stored in the memory unit 201.

Figures 21, 22:
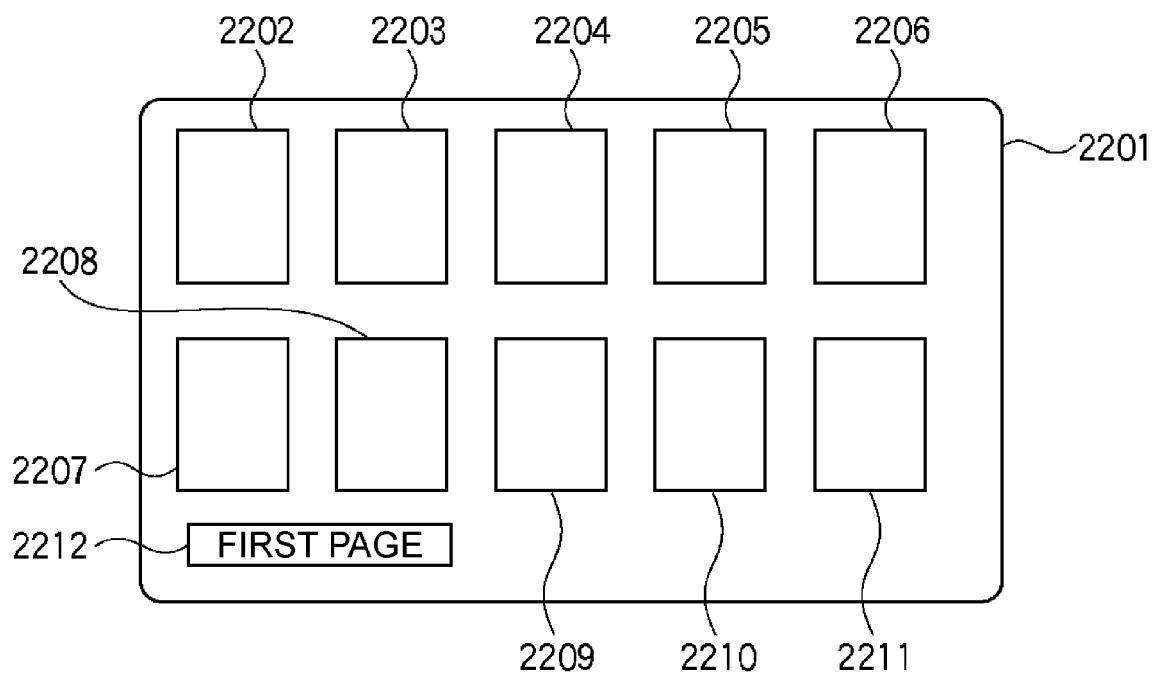
FIG. 21 is a diagram showing an exemplary configuration of a color bin penalty matrix according to an embodiment of the present invention.
FIG. 22 is a diagram showing an exemplary user interface according to an embodiment of the present invention.

The color bin penalty matrix will be described with reference to FIG. 21 which is a diagram showing an exemplary configuration of a color bin penalty matrix according to an embodiment of the present invention.

The color bin penalty matrix manages the local similarity distance between color bin IDs. Referring to FIG. 21, the color bin penalty matrix is configured so that the similarity distance between the same color bin IDs can be zero, and, as the difference between color bin IDs increases, i.e., as a similarity level decreases, the similarity distance can increase. In the color bin penalty matrix, the values of all the intersection points of the same color bin IDs are zero, and the similarity distances are symmetric about a diagonal line connecting all the intersection points.

Thus, in this embodiment, a similarity distance between color bin IDs can be acquired only by referring to a color bin penalty matrix, whereby high-speed processing can be achieved.

In step S2007, the next focused mesh block to be processed is set by referring to the sequence decision table shown in FIG. 14. Subsequently, the process returns to step S2004.

In step S2004, when an uncompared mesh block is not present (NO in step S2004), the process proceeds to step S2008. In step S2008, the similarity distance stored in the memory unit 201 is converted into a similarity level, and is then output along with a corresponding block ID.

The conversion into a similarity level is performed as follows. For example, the similarity level is set to 100% for the minimum value of a similarity distance, and is set to 0% for the maximum value of a similarity distance. Another similarity level can be calculated from a similarity distance using the difference between the similarity distance and the maximum or minimum value.

[Exemplary Text Feature Quantity Information Comparison Processing]

The details of the text feature quantity information comparison processing performed in step S1904 will now be described. In this processing, character codes in the text blocks of comparison source and target images are compared. Subsequently, a similarity level is calculated in accordance with the matching of the character codes.

When a paper document functioning as a retrieval condition is compared with its original document, it is desirable that the similarity level becomes 100%. However, in practice, in the OCR processing performed upon text blocks in the paper document, a recognition error may occur. Therefore, even if a paper document is compared with its original document, the similarity level may not become 100%, but becomes approximately 100%. In such a case, they can be regarded as being the same document.

[Exemplary Integration Processing]

Details of the integration processing performed in step S1905 will now be described. In the integration processing, the calculated similarity levels of all blocks are integrated so that the similarity level of a block covering a larger part of an original document, which is a comparison target image, can be more significantly reflected in the similarity level of the entire original document.

For example, it is assumed that the similarity ratios n1 through n6 of blocks B1 through B6 included in an original document have been individually calculated. At that time, the integrated similarity level ratio N of the entire original document is given by $$N = w1 \times n1 + w2 \times n2 + w3 \times n3 + \ldots + w6 \times n6 \quad (1)$$

where w1 to w6 are weighting factors for evaluating the similarity levels of blocks. The weighting factors w1 to w6 are individually calculated from a ratio of a block to other blocks (occupation ratio) in an original document. For example, it is assumed that the sizes of the blocks 1 to 6 are represented as S1 to S6, respectively. At that time, the occupation ratio w1 of the block 1 is given by $$w1 = S1/(S1 + S2 + \ldots + S6) \quad (2)$$

By performing weighting processing by unit of such an occupation ratio, the similarity level of a block that covers a larger part of an original document, which is a comparison target image, can be more significantly reflected in the similarity level of the entire original document.

[User Interface for Option Display/Selection Processing]

An exemplary user interface used for the option display/selection processing performed in step S910 will be described with reference to FIG. 22 which is a diagram showing an exemplary user interface according to an embodiment of the present invention.

A display area 2201 is configured with a touch panel that allows a user to input a selection instruction by directly touching a screen thereof. Thumbnail images 2202 through 2211 of potential original documents (electronic files or image data) are output as a comparison result, and are displayed from the thumbnail image 2202 in descending order of similarity levels.

In this example, up to ten thumbnail images can be displayed. When there are ten or more potential original documents, the top ten thumbnail images can be displayed at once. A user can select a desired original document by selecting a desired thumbnail image from among these thumbnail images 2202 to 2211, and perform various processing operations upon the selected original document.

A button 2212 represents information about which the page of potential original documents is displayed. By touching the button 2212, another page of potential original documents can be displayed.

[Exemplary User Interface for Standard Paper Size Setting]

A standard paper size used for determination processing in this embodiment may be automatically set to either the most commonly used A4 or letter (US) size in the image processing apparatus, or may be set by a user using a dedicated user interface.

FIG. 23 is a diagram showing an exemplary user interface for setting a standard paper size according to an embodiment of the present invention. A display area 2301 is configured with, for example, a touch panel that allows a user to input a selection instruction by directly touching a screen thereof. Standard paper size options 2302 to 2311 are displayed. In this example, up to ten paper sizes are displayed as standard paper size options. For example, by touching a desired standard paper size option, a standard paper size setting can be achieved. Further it is noted that the standard paper size having been set is used in the succeeding process of registering and retrieving image data.

Still referring to FIG. 23, a button 2312 is displayed when there are more than ten standard paper size options. By touching the button, another page of standard paper size options can be displayed.

As described previously, according to this embodiment, even if in a case where a margin area, which did not exist in an original image, is present around a document area in a document acquired by printing the original image, an accurate layout comparison between the scanned image of the printed document and the original image can be performed. Accordingly, by using this layout comparison, accurate retrieval processing can be achieved.

Other Exemplary Embodiments

In the above embodiment, image size and block information are represented using pixel values and are stored in advance. When a layout comparison based on the relative coordinate system is performed, the pixel values are converted into normalized relative coordinates. However, other cases can be considered.

For example, an image size may be represented using a unit of linear measure such as cm or inch and is then stored in advance for a layout comparison. Block information may be represented using normalized relative coordinates, and then be stored in advance for a layout comparison. When a layout comparison based on the relative coordinate system is performed, the stored relative coordinates are used. When a layout comparison based on the absolute coordinate system is performed, the stored relative coordinates may be converted into absolute coordinates. Furthermore, block information represented by the relative coordinate system and block information represented by the absolute coordinate system may be individually stored in advance, whereby paper size information is not required.

Exemplary embodiments have been described in detail, but the present invention is not limited thereto. For example, the present invention can be practiced in the forms of a system, an apparatus, a method, a program, a storage medium, etc. More specifically, the present invention may be applied to a system including a plurality of devices or an apparatus formed by a single device.

The present invention may be achieved as follows. A software program achieving the functions of the above-described embodiments (a program corresponding to flowcharts shown in the drawings in the above-described embodiment) is directly or remotely provided to a system or an apparatus. The program code provided to the system or apparatus is read out and executed, whereby the present invention can be achieved.

Accordingly, the present invention can also be achieved by a program code that is installed on a computer so as to cause the computer to achieve the functional processing of the present invention.

Instead of the program code, other forms having the function of the program code such as an object code, a program executed by an interpreter, and script data provided to an OS, may be adopted.

A storage medium for providing a program includes, for example, a floppy disk, a hard disk, an optical disc, a magneto-optical disk, an MO, a CD-ROM, a CD-R, a CD-RW, a magnetic tape, a nonvolatile memory card, a ROM, and a DVD (DVD-ROM or DVD-R).

A program may be provided by connecting a client computer to an Internet home page via the browser of the client computer, and downloading from the home page to a storage medium such as a hard disk a computer program or a compressed file that has an automatic installation function. In addition, a program may be provided in such a manner that a program code configuring a program is divided into a plurality of files, and the divided files are individually downloaded from different home pages. That is, a WWW server that allows a plurality of users to download a program file required for causing a computer to perform functional processing of the present invention can be applied to the present invention.

A program may be encrypted, and be stored in a storage medium such as a CD-ROM, and then be sent to a user. If the user satisfies predetermined conditions, he or she is allowed to download decryption key information from a home page via the Internet, and executes the encrypted program using the downloaded decryption key information, and then installs the program on a computer.

When the computer executes the program, the functions of the above-described embodiments can be achieved. Furthermore, an OS or the like running on the computer may perform a part of or all of the processing in accordance with the instruction of the program, whereby the functions of the above-described embodiments can be achieved.

Still furthermore, the program read out from the storage medium may be written in a feature expansion board inserted into a computer or in a memory provided to a feature expansion unit connected to a computer. Subsequently, a CPU provided to the feature expansion board or unit performs a part of or all of the processing in accordance with the instruction of the program, whereby the functions of the above-described embodiments can be achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Application No. 2005-231171 filed Aug. 9, 2005, which is hereby incorporated by reference herein in its entirety.

What is claimed:

1. An image processing apparatus for performing image similarity comparison processing, comprising:
   a storing means for storing an original image as a comparison target image;
   an input means for inputting a comparison source image;
   an acquiring means for acquiring respective paper sizes from the comparison target image and comparison source image;
   an extracting means for extracting positional information and a size of a block having an attribute as block information from each of the comparison target image and the comparison source image;
   a normalizing means for normalizing the block information by using the respective paper size;
   a first comparison means for comparing a layout of the comparison target image and a layout of the comparison source image using the respective normalized block information
   a determination means for determining whether the size of the original image is a predetermined size; and
   a second comparison means for comparing, when it has been determined by the determination means that the size of the original image is not the predetermined size and when the layout of the comparison target image does not correspond to the layout of the comparison source image as a result of comparison by the first comparison means, the layout of the comparison target image and the layout of the comparison source image using the respective unnormalized block information.

2. The image processing apparatus according to claim 1, wherein the unnormalized block information is based on the absolute coordinate system and the normalized block information is based on the relative coordinate systems.

3. A control method of controlling an image processing apparatus that performs image similarity comparison processing, comprising the steps of:
   storing an original image as a comparison target image;
   inputting a comparison source image;
   acquiring respective paper sizes from the comparison target image and comparison source image;
   extracting positional information and a size of a block having an attribute as block information about each of the comparison target image and comparison source image;
   normalizing the block information by using the respective paper size;
   comparing a layout of the comparison target image and a layout of the comparison source image using the respective normalized block information;
   comparing a layout of the comparison target image and a layout of the comparison source image using the respective normalized block information determining whether the size of the original image is a predetermined size; and comparing, when it has been determined that the size of the original image is not the predetermined size and when the layout of the comparison target image does not correspond to the layout of the comparison source image as a result of comparison using the respective normalized block information, the layout of the comparison target image and the layout of the comparison source image using the respective unnormalized block information.

4. A non-transitory computer readable storage medium storing a computer program which causes a computer to execute the steps of:

storing an original image as a comparison target image;

inputting a comparison source image;

acquiring respective paper sizes from the comparison target image and comparison source image;

extracting positional information and a size of a block having an attribute as block information about each of the comparison target image and comparison source image;

normalizing the block information by using the respective paper size;

comparing a layout of the comparison target image and a layout of the comparison source image using the respective normalized block information;

comparing a layout of the comparison target image and a layout of the comparison source image using the respective normalized block information determining whether the size of the original image is a predetermined size; and comparing, when it has been determined that the size of the original image is not the predetermined size and when the layout of the comparison target image does not correspond to the layout of the comparison source image as a result of comparison using the respective normalized block information, the layout of the comparison target image and the layout of the comparison source image using the respective unnormalized block information.

5. The image processing apparatus according to claim 1, further comprising:

output means for outputting a result whether the layout of the comparison target image corresponds to the layout of the comparison source image or not, wherein the output means output a result that the layout of the comparison target image corresponds to the layout of the comparison source image when the layout of the comparison target image corresponds to the layout of the comparison source image as a result of comparison by the first comparison means.

6. The image processing apparatus according to claim 1, further comprising:

calculation means for calculating a degree of similarity between the comparison target image and the comparison source image, the layouts of which correspond to each other as a result of comparison by the first comparison means or the second comparison means.

7. The image processing apparatus according to claim 1, wherein the determination means, when the layout of the comparison target image does not correspond to the layout of the comparison source image as a result of comparison by the first comparison means, determines whether the paper size of the comparison source image is the predetermined size or not, and wherein the second comparison means, when the determination means determines that the paper size of the comparison source image is not the predetermined size, does not compare the layout of the comparison target image and the layout of the comparison source image but determines that the comparison source image is not similar to the comparison target image.

* * * * *